(12) United States Patent
Stearns

(10) Patent No.: US 10,221,950 B1
(45) Date of Patent: Mar. 5, 2019

(54) HIGH PRESSURE COUPLER

(71) Applicant: Stedlin Manufacturing Incorporated, Duluth, MN (US)

(72) Inventor: Frank Stearns, Superior, WI (US)

(73) Assignee: Stedlin Manufacturing Incorporated, Duluth, MN (US)

( * ) Notice: Subject to any disclaimer, the term of this patent is extended or adjusted under 35 U.S.C. 154(b) by 0 days.

(21) Appl. No.: 15/942,641

(22) Filed: Apr. 2, 2018

Related U.S. Application Data

(60) Provisional application No. 62/547,038, filed on Aug. 17, 2017.

(51) Int. Cl.
*F16K 1/54* (2006.01)
*F16L 37/40* (2006.01)
*F16L 15/04* (2006.01)

(52) U.S. Cl.
CPC .............. *F16K 1/54* (2013.01); *F16L 15/04* (2013.01); *F16L 37/40* (2013.01)

(58) Field of Classification Search
CPC .............. F16K 17/30; Y10T 137/7792; Y10T 137/7869; Y10T 137/7729; G05D 7/012
USPC ...... 138/43, 45, 46; 137/460, 504, 517, 462, 137/513.3
See application file for complete search history.

(56) References Cited

U.S. PATENT DOCUMENTS

| | | | | |
|---|---|---|---|---|
| 3,122,162 A | * | 2/1964 | Sands | F16K 17/30 137/498 |
| 3,141,477 A | * | 7/1964 | Campbell | A47L 15/4217 138/45 |
| 3,164,141 A | * | 1/1965 | Jones | F01M 13/023 123/574 |
| 3,409,050 A | * | 11/1968 | Weese | F16K 47/10 137/517 |
| 3,992,898 A | * | 11/1976 | Duell | F25B 41/06 62/324.6 |
| 4,456,029 A | * | 6/1984 | McCrum | F16K 17/30 137/498 |

(Continued)

FOREIGN PATENT DOCUMENTS

| | | |
|---|---|---|
| CN | 202082442 U | 12/2011 |
| JP | 64-5181 Y2 | 2/1989 |

(Continued)

OTHER PUBLICATIONS

International Search Report and Written Opinion for Application No. PCT/US2018/046921 dated Dec. 10, 2018.

*Primary Examiner* — Patrick F Brinson
(74) *Attorney, Agent, or Firm* — Merchant & Gould P.C.

(57) ABSTRACT

This disclosure is directed to couplers which significantly reduce the production of noise when disconnected from a mating coupler, thus addressing a significant occupational safety problem in the field of compressed air couplings. Accordingly, one aspect of the disclosure provides a coupler which may be used to connect/disconnect an air hose subjected to high air pressure while suppressing or dampening the noise typically produced upon disconnecting the coupler. In some examples, a coupler is provided with a valve having axial passageways that facilitate the relatively free flow of air during normal operation that become partially occluded upon an action disconnecting the coupler to significantly reduce sound levels.

3 Claims, 31 Drawing Sheets

(56) References Cited

U.S. PATENT DOCUMENTS

| | | | |
|---|---|---|---|
| 4,609,014 A * | 9/1986 | Jurjevic | G05D 7/012 137/504 |
| 4,896,696 A * | 1/1990 | Bradley | F16L 55/027 137/513.3 |
| 5,085,246 A * | 2/1992 | Griinke | F16K 17/30 137/504 |
| 5,186,021 A * | 2/1993 | Keller | F25B 41/06 137/513.3 |
| 5,215,113 A * | 6/1993 | Terry | F16K 17/30 137/460 |
| 5,312,083 A | 5/1994 | Ekman | |
| 5,582,204 A | 12/1996 | Hiranuma et al. | |
| 5,704,391 A * | 1/1998 | McGowan, Jr. | F16K 17/12 137/454.2 |
| 6,102,075 A * | 8/2000 | Phillips | F16L 55/04 137/513.5 |
| 6,412,828 B1 | 7/2002 | Lacroix et al. | |
| 6,626,465 B2 | 9/2003 | Lacroix et al. | |
| 6,920,895 B2 * | 7/2005 | Avis | F16K 17/30 137/462 |
| 6,926,312 B2 | 8/2005 | Lacroix et al. | |
| 7,140,386 B2 * | 11/2006 | Avis | F16K 17/30 137/504 |
| 7,219,690 B2 * | 5/2007 | McDonald | F16K 17/30 137/512.1 |
| 7,222,637 B2 | 5/2007 | Miyajima | |
| 7,503,592 B2 | 3/2009 | Durieux et al. | |
| 7,552,745 B2 | 6/2009 | Nishiyama et al. | |
| 7,686,033 B2 | 3/2010 | Niki et al. | |
| 7,753,415 B2 | 7/2010 | Tiberghien et al. | |
| 7,887,102 B2 | 2/2011 | Tiberghien et al. | |
| 8,256,743 B2 | 9/2012 | Tiberghien et al. | |
| 9,410,635 B2 * | 8/2016 | Akimoto | G05D 7/0133 |
| 2004/0094739 A1 | 5/2004 | Lacroix et al. | |
| 2007/0252101 A1 | 11/2007 | Khaitov | |
| 2008/0088127 A1 | 4/2008 | Tiberghien | |
| 2008/0178948 A1 | 7/2008 | Wilmshurst et al. | |
| 2009/0085348 A1 | 4/2009 | Tiberghien et al. | |
| 2014/0048148 A1 | 2/2014 | Martin | |
| 2017/0184242 A1 | 6/2017 | Tiberghien et al. | |

FOREIGN PATENT DOCUMENTS

| | | |
|---|---|---|
| JP | 2004-176873 A | 6/2004 |
| JP | 2012-42056 A | 3/2012 |
| JP | 2015-113937 A | 6/2015 |

* cited by examiner

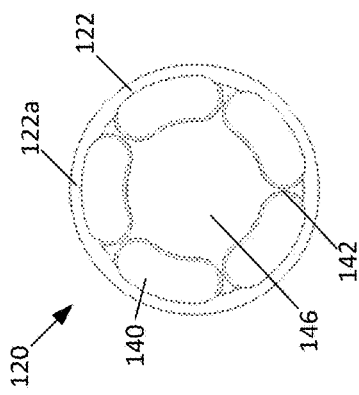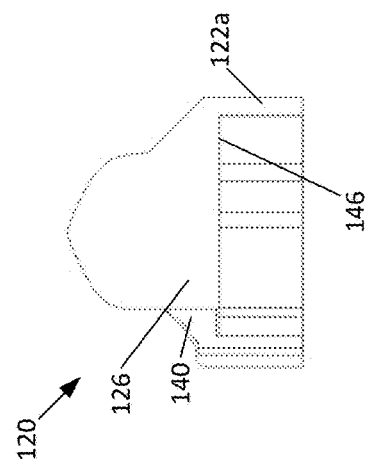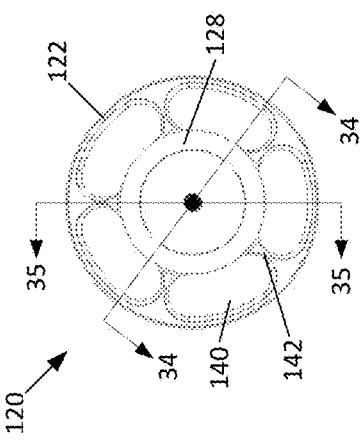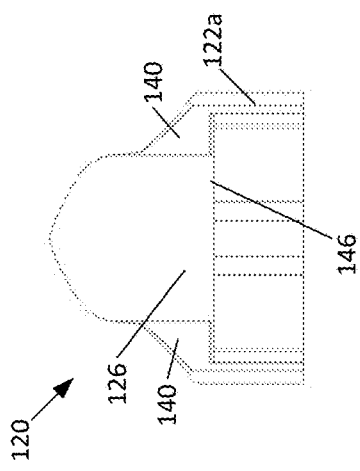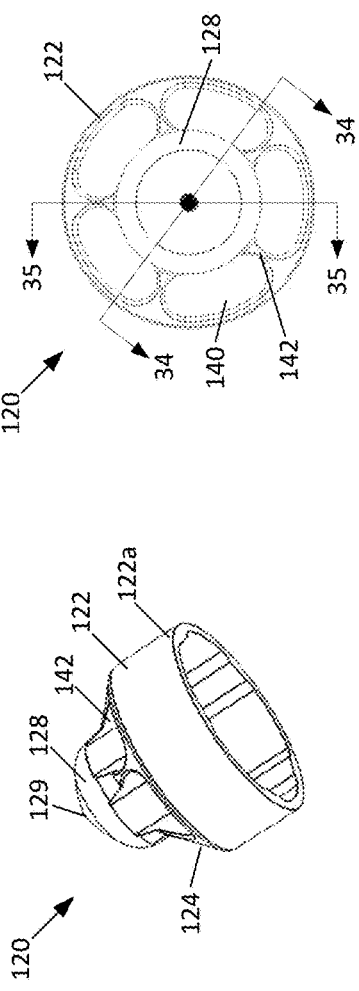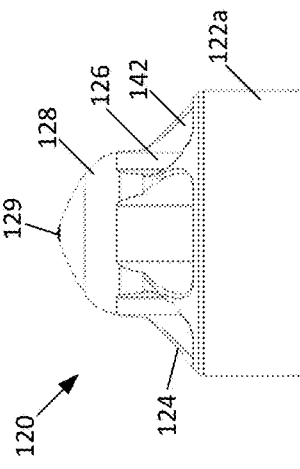

HIGH PRESSURE COUPLER

RELATED APPLICATIONS

This application claims priority to U.S. Provisional Application Ser. No. 62/547,038, filed on Aug. 17, 2017, the entirety of which is incorporated by reference herein.

TECHNICAL FIELD

The present invention relates generally to high-pressure couplers, more particularly, to quick connect/disconnect air hose couplers with sound suppression.

BACKGROUND

Various air hose couplers are currently available. These couplers usually include a male coupler portion, usually referred to as a plug, which may be detachably inserted into a female coupler. A slide sleeve, usually mounted about the female coupler, may be moved into a disconnect position permitting the plug to disconnect from the female coupler. The air pressure in the air hose may be relatively high, for example in the range of 150 psi. Upon disconnecting the plug, the high air pressure tends to sling the plug and air hose connected thereto away from the female coupler while simultaneously emitting a loud noise, for example in the range of 130 decibels (dBA). The production of sound at these levels can cause significant damage to the human ear, including causing deafness. As such, a serious safety issues exists with many prior art plugs. Many prior art plugs are also difficult to reconnect the plug to the female coupler because great force may be required to insert the plug into the female coupler against the high air pressure in the air hose.

SUMMARY

This disclosure is directed to couplers which significantly reduce the production of noise when disconnected from a mating coupler, thus addressing a significant occupational safety problem in the field of compressed air couplings. Accordingly, one aspect of the disclosure provides a coupler which may be used to connect/disconnect an air hose subjected to high air pressure while suppressing or dampening the noise typically produced upon disconnecting the coupler.

In one example embodiment, a coupler includes a connector body including a sidewall defining an interior passageway extending along a longitudinal axis between a first open end and a second open end. In one aspect, the coupler includes a valve or valve body disposed within the connector body interior passageway, the valve defining one or more axial passageways extending in a direction generally parallel to the longitudinal axis, the valve being movable within the connector body between a first position and a second position. In the first position, a first end of the valve is seated within the connector body such that a fluid flowing from the first open end to the second open end can pass through the one or more axial passageways. In the second position, a second end of the valve abuts the connector body sidewall such that the one or more axial passageways are at least partially occluded by the connector body sidewall such an airflow flowing from the second open end to the first open end is restricted.

In some examples, the one or more axial passageways each define a first open area and wherein the first open area is occluded by at least 90 percent by the connector body sidewall when the valve is in the second position.

In some examples, the connector body sidewall defines a first shoulder against which the valve seats when in the first position.

In some examples, the connector body sidewall defines a second shoulder against which the valve abuts when in the second position, the second shoulder tapering inwardly in the direction from the second open end towards the second open end.

In some examples, the connector body is a unitarily formed body.

In some examples, the valve is unitarily formed.

In some examples, the coupler consists of only the connector body and the valve.

In some examples, the connector body is formed from a metal material and the valve is formed from a polymeric material.

In some examples, the connector body and the valve are both formed from a polymeric material.

In some examples, the connector body defines a first coupling arrangement proximate the first open end and a second coupling arrangement proximate the second open end.

In some examples, the first coupling arrangement and the second coupling arrangement are each one of a male quick-disconnect coupler, a female quick-disconnect coupler, a male threaded connection, a female threaded connection, and a barbed fitting connection.

In some examples, the first connector body part is separable from the second connector body part.

In some examples, the first connector body part sidewall defines a first shoulder against which the valve seats when in the first position.

In some examples, the second connector body part sidewall defines a second shoulder against which the valve abuts when in the second position, the second shoulder tapering inwardly in the direction from the second open end towards the second open end.

In some examples, the first connector body part defines a first coupling arrangement proximate the first open end and the second connector body part defines a second coupling arrangement proximate the second open end.

In some examples, the first coupling arrangement and the second coupling arrangement are each one of a male quick-disconnect coupler, a female quick-disconnect coupler, a male threaded connection, a female threaded connection, and a barbed fitting connection.

In one example, a coupler adapted for detachable connection with a female coupling body is disclosed. The coupler can include an elongated body having a longitudinal axis, said elongated body including a proximal end portion, an intermediate portion and a distal end portion in axial alignment, said proximal end portion defining a first segment of a passageway extending through said elongated body, a lock ring engaged in a groove formed in said first segment of said passageway, said groove being oriented transverse to said longitudinal axis of said elongated body, a valve housed within said first segment of said passageway, said lock ring providing a stop shoulder for limiting axial movement of said valve.

In some examples, the intermediate portion of said elongated body defines a second segment of said passageway, said second segment of said passageway terminating at a circumferential inwardly tapering shoulder circumscribing an inlet opening of said second segment of said passageway.

In some examples, the valve comprises a valve having an axis concentric with said longitudinal axis of said elongated body, said valve including a substantially cylindrical base, a generally conical portion extending from said base to a cylindrical portion disposed between said conical portion and a generally conical radiused surface, and a tip portion forming a forward distal end of said valve.

In some examples, the valve includes a plurality of passages extending through said valve substantially parallel to and radially offset from said valve axis In some examples, the coupler body includes a circumferential radiused surface adjoining said tapering shoulder defining said inlet of said second segment of said passageway.

In one example, a safety coupler is disclosed including a connector body including a sidewall defining an interior passageway extending along a longitudinal axis between a first open end and a second open end; and a movable valve disposed within the connector body interior passageway, the valve defining one or more axial passageways extending in a direction generally parallel to the longitudinal axis, the valve being movable within the connector body between a normal air flow position and a sound reduction position; wherein in the normal airflow position, the valve has less than a 10 psi pressure drop at an airflow rate of 20 to 50 scfm through the interior passageway; wherein in the sound reduction position, the valve reduces a coupler disconnect sound level by at least 20 dBA in comparison to a disconnect sound level when the connector body is used without the valve installed within the interior passageway.

In some examples, the insertion of the valve within the coupler body causes less than a 5 psi pressure drop increase when the valve is in the normal airflow position.

In some examples, the insertion of the valve within the coupler body reduces the coupler disconnect sound level by at least 30 dBA such that the disconnect sound output is less than 100 dBA at pressures up to 140 psi.

BRIEF DESCRIPTION OF THE DRAWINGS

So that the manner in which the above recited features, advantages, and objects of the present invention can be understood in detail, a more particular description of example embodiments of the disclosure briefly summarized above, may be had by reference to the example embodiments thereof which are illustrated in the appended drawings.

It is noted, however, that the appended drawings illustrate only typical example embodiments of this invention and are therefore not to be considered limiting of its scope, for the invention may include other equally effective embodiments.

FIG. 30 is a perspective view of a second example of a valve usable in the couplers shown in FIGS. 1 to 29.

FIG. 31 is a top view of the valve shown in FIG. 30.

FIG. 32 is a bottom view of the valve shown in FIG. 30.

FIG. 33 is a side view of the valve shown in FIG. 30.

FIG. 34 is a cross-sectional view of the valve shown in FIG. 30, taken along the line 34-34 shown in FIG. 31.

FIG. 35 is a cross-sectional view of the valve shown in FIG. 30, taken along the line 35-35 shown in FIG. 31.

DETAILED DESCRIPTION

Figure 1:
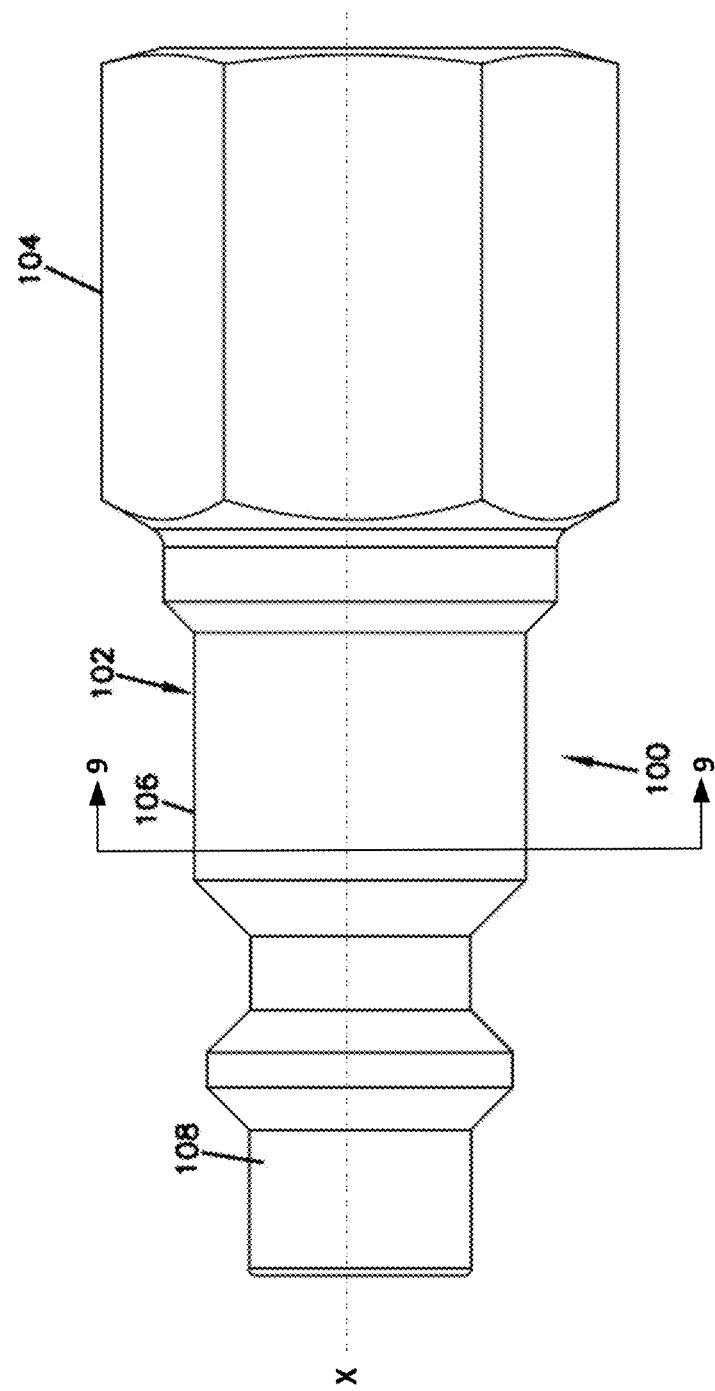
FIG. 1 is a side view of a coupler for connection to a pressurized fluid source in accordance with principles of the disclosure.
Figure 2:
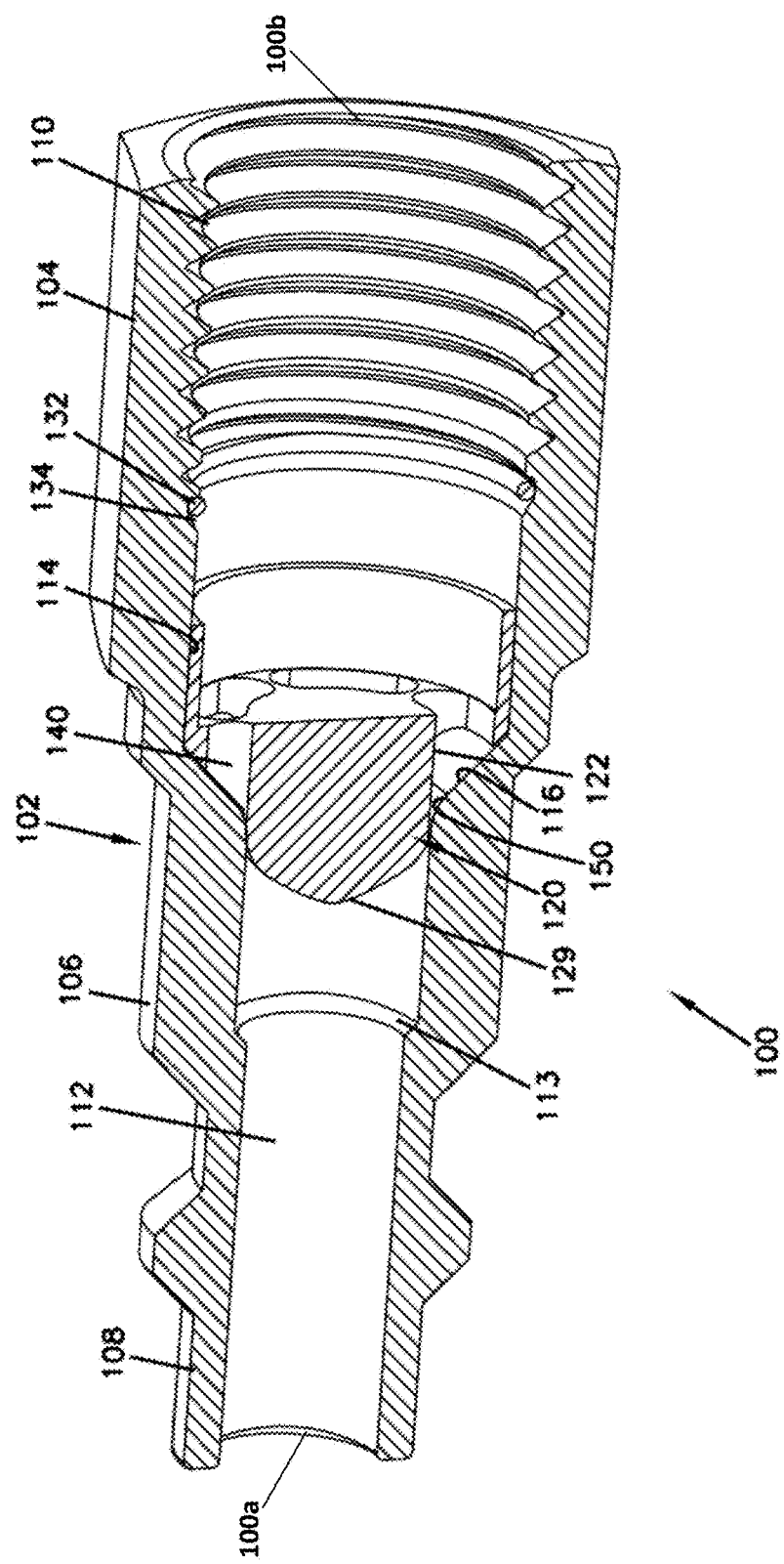
FIG. 2 is a perspective section view of the coupler shown in FIG. 1.

Referring first to FIGS. 1 and 2, a coupler for connection to a line or fitting connected to a pressurized fluid source, such as but without limitation, an air hose and the like, is generally identified by the reference numeral 100. The coupler 100 may be generally similar to couplers designed to cooperatively engage with a female coupler (not shown in the drawings) in a manner known in the art. For example, the coupler 100 may be utilized in a coupler assembly of the type shown in U.S. Provisional Patent Application Ser. No. 62/596,281, filed on Dec. 8, 2017, entitled Orbital Coupling Arrangement, the entirety of which is incorporated by reference herein. As shown, the coupler 100 extends between a first open end 100a and a second open end 100b. The coupler 100 may include an elongated body 102 having an enlarged diameter proximal end 104, an intermediate portion 106 and a distal end 108. The proximal end 104 may be multisided so that the coupler 100 may be conveniently rotated for connection to a threaded fitting (not shown in the drawings), such as but without limitation, a hose fitting and the like. The elongated body 102 can be formed from a metal material or a polymeric material, depending upon application.

The proximal end 104 of the coupler 100 may include an internally threaded portion 110 for threaded connection to the threaded fitting. Those skilled in the art will recognized however that the coupler 100 may include an externally threaded proximal end, if desired. An axial passageway 112 having a longitudinal axis X may extend through the body 102 of the coupler 100. The proximal end 104 of the coupler 100 may include a non-threaded cylindrical portion 114 which terminates at a circumferential inwardly tapering shoulder 116. The terminal end of the shoulder 116 circumscribes the opening to the intermediate portion 106 of the coupler body 102. The diameter of the intermediate portion 106 is reduced relative to the adjoining proximal end 104 of the coupler 100. At the opposite end of the intermediate portion 106, a circumferential inwardly tapering surface 113 circumscribes the opening to the distal end 108 of the coupler 100. The diameter of the distal end 108 is reduced relative to the adjoining intermediate portion 106.

Figure 3:
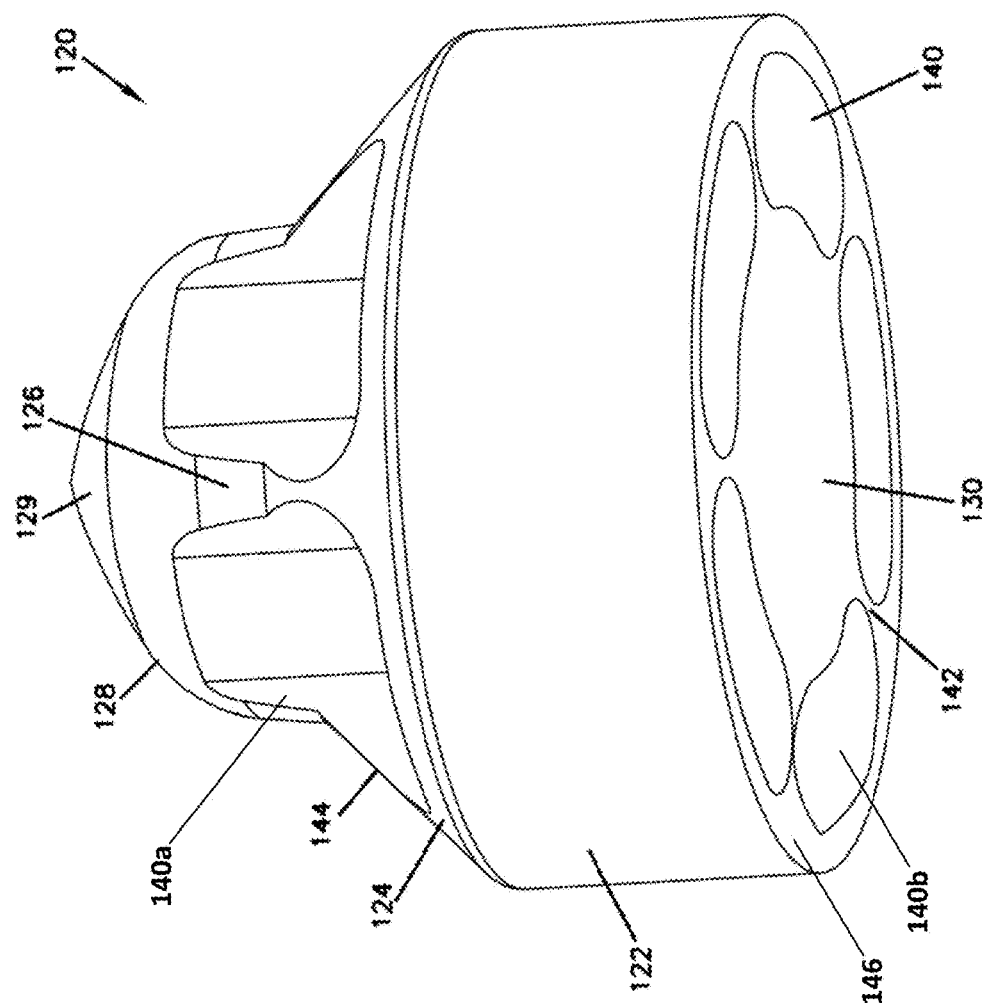
FIG. 3 is a perspective view of a valve carried in the coupler shown in FIG. 1.

Referring next to FIG. 3, a valve 120 may be housed in the non-threaded cylindrical portion 114 of the proximal end 104 of the coupler body 102. The valve 120, which may also be characterized as a valve body or a slide valve, may be formed from a polymeric material or a metal material. The valve 120 may include a cylindrical body portion 122, a generally conical portion 124, a cylindrical intermediate portion 126 disposed between the conical portion 124 and a radiused surface 128, and a tip portion 129. The valve 120 may include a central core 130 having a longitudinal axis concentric with the longitudinal axis of the passageway 112. The diameter of the valve portion 122 may be substantially the same as the diameter of the non-threaded cylindrical portion 114 of the proximal end 104 of the coupler body 102 but the valve 120 may freely move or reciprocate within the coupler body 102 in response to a pressure force applied to the valve 120. A lock ring 132 engaged in a groove 134 formed in the inner surface of the proximal end 104 of the coupler 100 may retain the valve 120 within the passageway 112 and provides a stop shoulder for axial movement of the valve 120. As discussed in more detail later, the coupler 100 can be configured to provide the stop shoulder without the use of a lock ring.

The valve 120 may include a plurality of longitudinal apertures 140 extending through the valve portion 122. The apertures 140 may also be referred to as axial passageways. The apertures 140 may extend parallel to and may be radially offset from the longitudinal axis of the valve 120, thereby forming multiple longitudinal fluid passages through the valve 120. The apertures 140 may be isolated from each other by partition walls 142. The forward ends 144 of the partition walls 142 may extend at an angle from the intermediate portion 126 to the cylindrical body portion 122 of the valve 120. The forward ends 144 of the partition walls 142 and the conical portion 124 of the valve 120 may form a coplanar generally conical sealing surface having a uniform angle relative to the longitudinal axis of the valve 120 for sealing engagement with the shoulder 116 of the proximal end 104 of the coupler 100. As shown, the conical portion 124, forward ends 144, and shoulder 116 are disposed at an oblique angle to the longitudinal axis X. In some examples, the oblique angle is an acute angle. In one example, the oblique angle is about 45 degrees. Other angles are possible.

Referring again to FIG. 2, a transition region between the shoulder 116 of the proximal end 104 and the cylindrical interior surface of the intermediate portion 106 of the coupler body 102 may be defined by a circumferential radiused surface 150.

Figure 7:
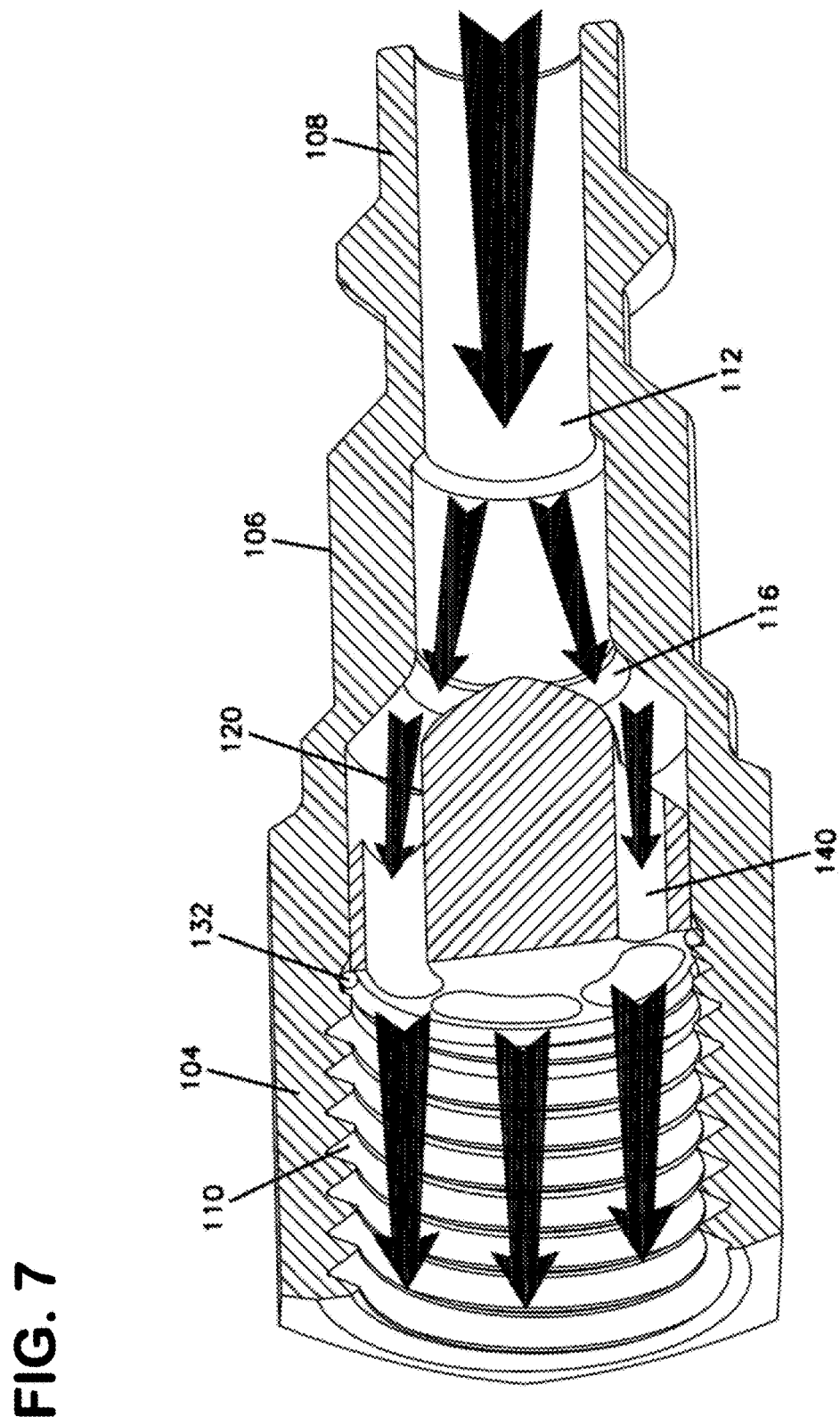
FIG. 7 is a perspective section view of the coupler shown in FIG. 1 illustrating the flow path through the coupler and the valve in the open or first position.
Figure 8:
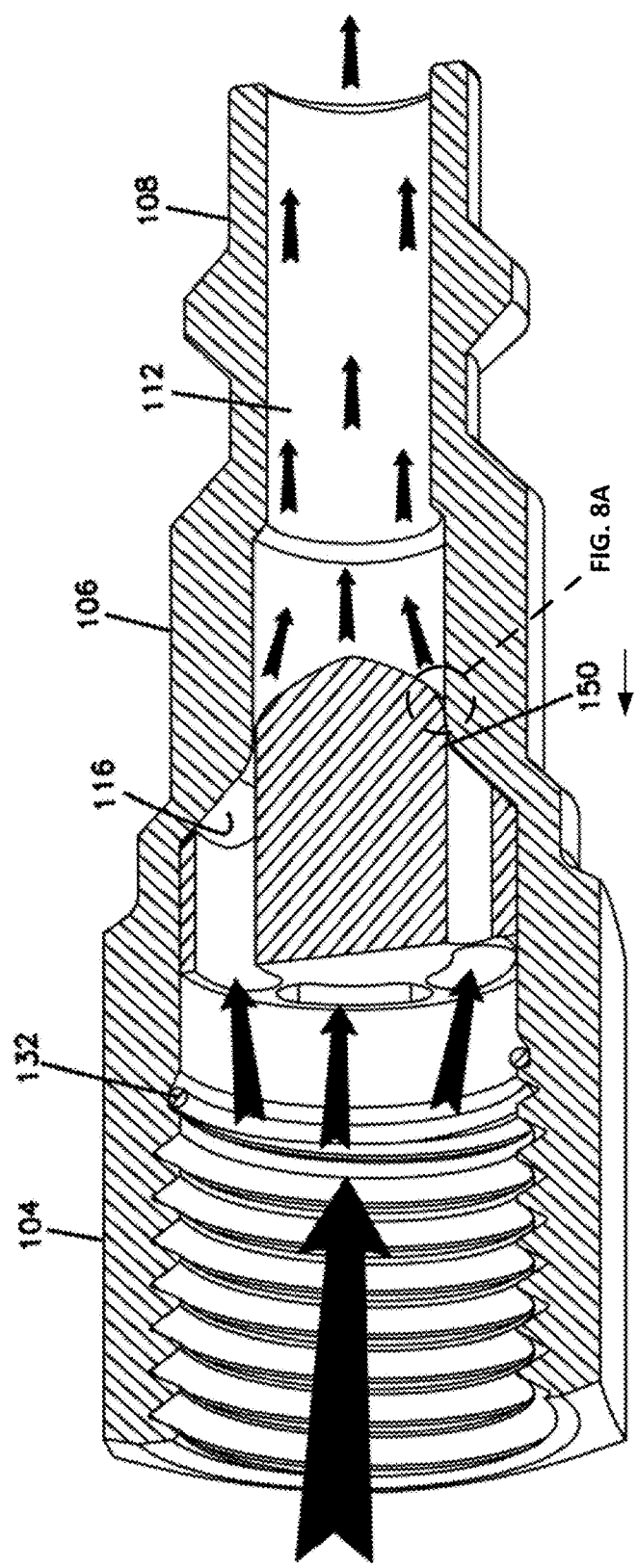
FIG. 8 is a perspective section view of the coupler shown in FIG. 1 illustrating the flow path through the coupler and the valve in the closed or second position.
Figure 8A:
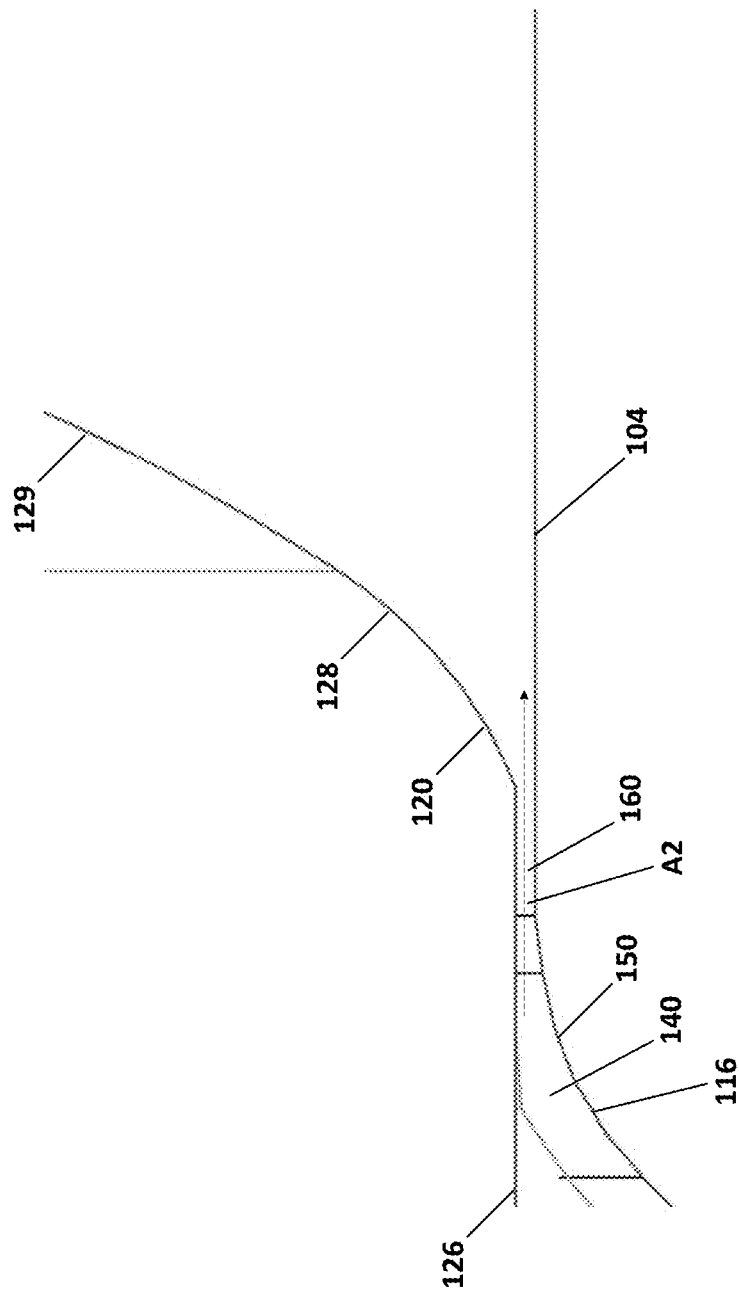
FIG. 8A is an enlarged portion of the section view of the coupler shown in FIG. 8, as indicated at FIG. 8.
Figure 9:
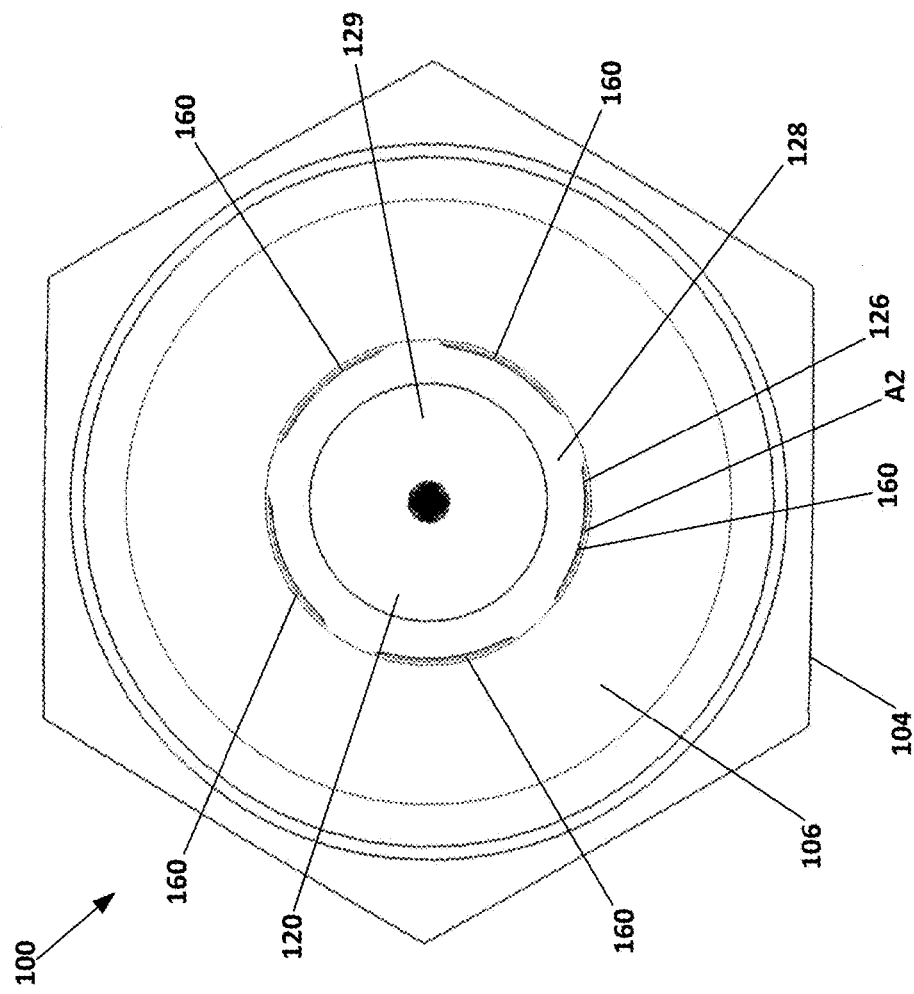
FIG. 9 is a cross-sectional view of the coupler shown in FIG. 1, taken along the line 9-9 in FIG. 1.
Figure 10:
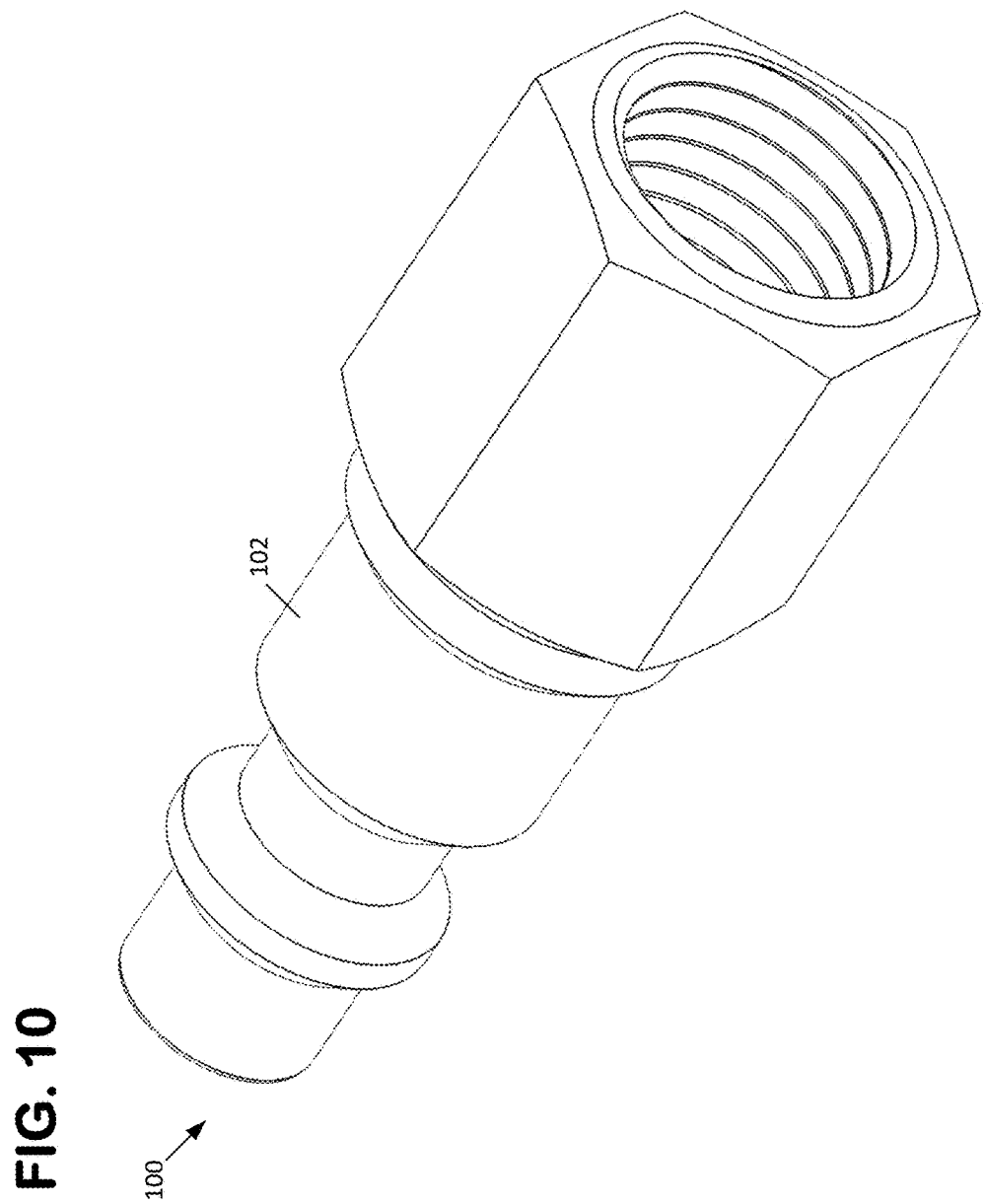
FIG. 10 is a perspective view of a second example of a coupler in accordance with concepts presented in the disclosure.
Figure 11:
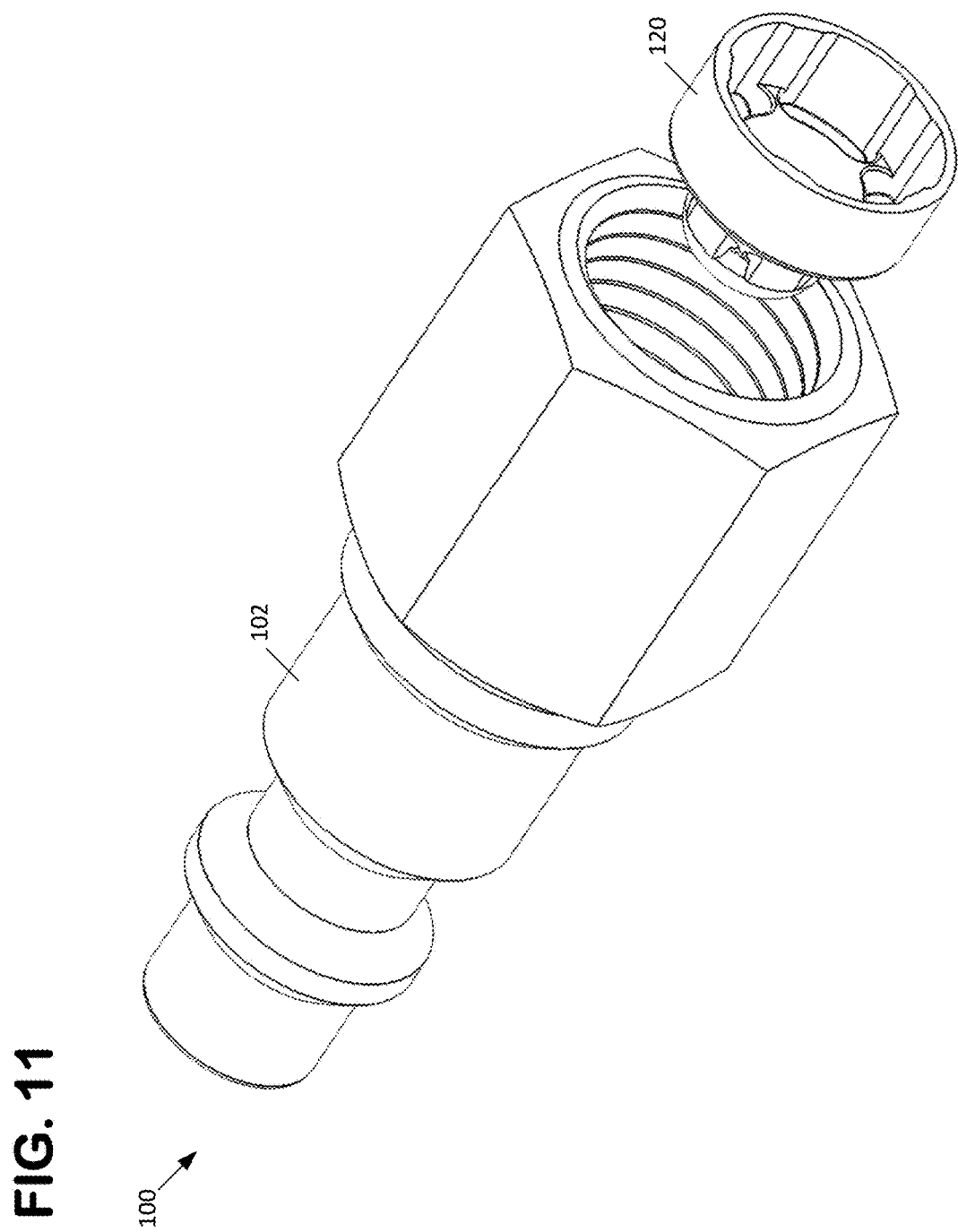
FIG. 11 is a perspective exploded view of the coupler shown in FIG. 10.

Referring now to FIGS. 7 and 8, the first position of the valve 120 upon connecting the coupler 100 to a pressurized fluid source is illustrated in FIG. 7, and the second position of the valve 120 upon disconnecting the coupler 100 from a pressurized fluid source is illustrated in FIG. 8. In the configuration illustrated in FIG. 7, the distal end 108 of the coupler 100, although not shown in the drawings, is presumed to be connected to a female coupler connected to an upstream pressurized fluid source, such as but without limitation, pressurized air. Upon connection, the pressurized air forces the valve 120 to move toward the downstream side of the coupler 100 into contact with the lock ring 132 such that the valve 120 is seated into the first position. In this position, maximum air flow with minimal restriction is permitted through the axial openings or apertures 140 as the axial openings or apertures 140 are relatively unoccluded by the shoulder 116, as indicated by the arrows in FIG. 7. Upon disconnecting the coupler 100 from the source of pressurized air, shown in FIG. 8, backpressure from downstream of the coupler 100 nearly instantaneously moves the valve 120 into partial sealing engagement with the shoulder 116 in the proximal end 104 of the coupler 100 such that the valve 120 is seated against the shoulder 116. In this second position of the valve 120, the axial openings or apertures 140 are largely occluded by the shoulder 116 such that only a narrow passageway 160 exists at the radiused surface 150 at the juncture between the intermediate portion 106 and the proximal end 104 of the coupler body 102, as indicated by the arrows in FIGS. 8 and 8A. The passageways 160 can also be seen at the cross-sectional view shown at FIG. 9.

In the example presented in the drawings, five axial openings or apertures 140 are circumferentially spaced along a common diameter within the valve 120. In one aspect, each opening 140 extends between a first open end 140a and a second open end 140b and has a cross-sectional area A1. More or fewer axial openings or apertures 140 can be provided. Additionally, although each opening 140 is shown as having a curved or arcuate oblong cross-sectional shape, other shapes are possible. In one aspect, the first open ends 140a extend through and are defined by the conical portion 124, the cylindrical intermediate portion 126, the radiused surface 128, and the forward ends 144 of the partition walls 142. The second open ends 140b extend through a base surface 146 of the valve 120, which is defined by the central core 130 and the partition walls 142. When the valve 120 is seated into the first position, the first open end 140a is spaced away from the shoulder 116 such that the first open end 140a is relatively unoccluded by the shoulder 116. Accordingly, an airflow can enter through the entire area A1 defined by the first open end 140a and exit through the entire area A1 defined by the second open end 140b when the valve 120 is in the first position. When the valve 120 is seated against the shoulder 116 in the second position, the first open end 140a is partially occluded by the shoulder 116 to form the restricted passageway 160, as most easily seen at FIGS. 8A and 9. Accordingly, an airflow can enter through the entire area A1 defined by the second open end 140b but can only exit through the unoccluded portion of the first open end 140a. In an alternative configuration, the valve 120 can be provided with a central aperture 141 to allow for an additional or minimum airflow volume to always be allowed to pass through the valve 120 regardless of the position of the valve 120 within the passageway 160, as shown at FIG. 4A.

The unoccluded portion of the first open end 140a, which is defined by the difference in diameters of the proximal end 104 of the coupler body 102 and the cylindrical intermediate portion 126 of the valve 120, defines a reduced area A2. Due to this difference in diameters and due to the openings 140 being axial openings, an axial or "line-of-sight" open passageway (e.g. 160) always exists between the first open end 100a and the second open end 100b of the coupler 100. However, configurations in which this line-of-sight passageway does not exist are still possible provided that some passageway of area A2 exists to allow air to pass through the valve 120. In one example, the valve 120 and coupler body 102 are configured such that the ratio of the area A2 to A1 is between 30 to 1 and 70 to 1, more preferably between 40 to 1 and 60 to 1, and more preferably about 50 to 1. It has been discovered that the disclosed design using occluded axial openings 140 creates an optimal downstream pressure drop to permit the coupler 100 to disconnect at a low sound level and without a burst of downstream air exiting the coupler 100 at a high pressure and velocity. For example, some embodiments of the disclosed design have been tested to produce only 75 decibels of sound when being disconnected from a pressurized hose at 160 psi, in comparison to the 135 decibels of sound produced when decoupling a standard coupler having no pressure reduction features. Testing results of the disclosed design demonstrating this advantageous performance are discussed in more detail later in this section.

In one example, a valve 120 is configured for use with a standard ¼" quick disconnect couplings/plug using the ¼-18 NPT pipe connection, and has a ratio of A1 to A2 of about 50:1. In such a configuration, each axial opening 140 of the valve 120 is provided with an area A1 of about 0.0125 square inches and cooperates with the coupler body to form an area A2 of about 0.00025 square inches such that the total area of all five openings (e.g. A1×5) is about 0.0625 square inches with the total unoccluded area of all five openings with the valve 120 in the closed position (e.g. A2×5) being about 0.00125. It has been discovered that a 50:1 ratio such as this yields an advantageous balance between sound reduction and vent time.

Referring to FIGS. 10 to 13, a second example of a coupler 100 is presented. As many features of the coupler 100 shown in FIGS. 1-9 are similar to the coupler 100 shown at FIGS. 10 to 13, the above description for coupler 100 of FIGS. 1-9 is largely applicable for this example. Accordingly, the following description will be limited to differentiating features. In contrast to the example shown at FIGS. 1-9, the coupler 100 shown at FIGS. 10 to 13 does not utilize a lock ring 132 and thus also does not include a corresponding groove 134 in the coupler body 102 for receiving the lock ring 132. A differently configured valve 120, shown in further detail at FIGS. 30 to 35, is also provided. In this example, a shoulder 135 with a support surface 135a facing towards the first open end 100a of the coupler 100 is provided in the coupler body 120. The shoulder 135 has an internal diameter that is less than the outer diameter of the valve cylindrical outer body 122, and thus provides a support structure against which the valve 120 can seat when the valve 120 is in the first position. This configuration allows for a coupler 100 to be constructed that includes only two parts: the coupler body 102 and the valve 120.

Figure 4:
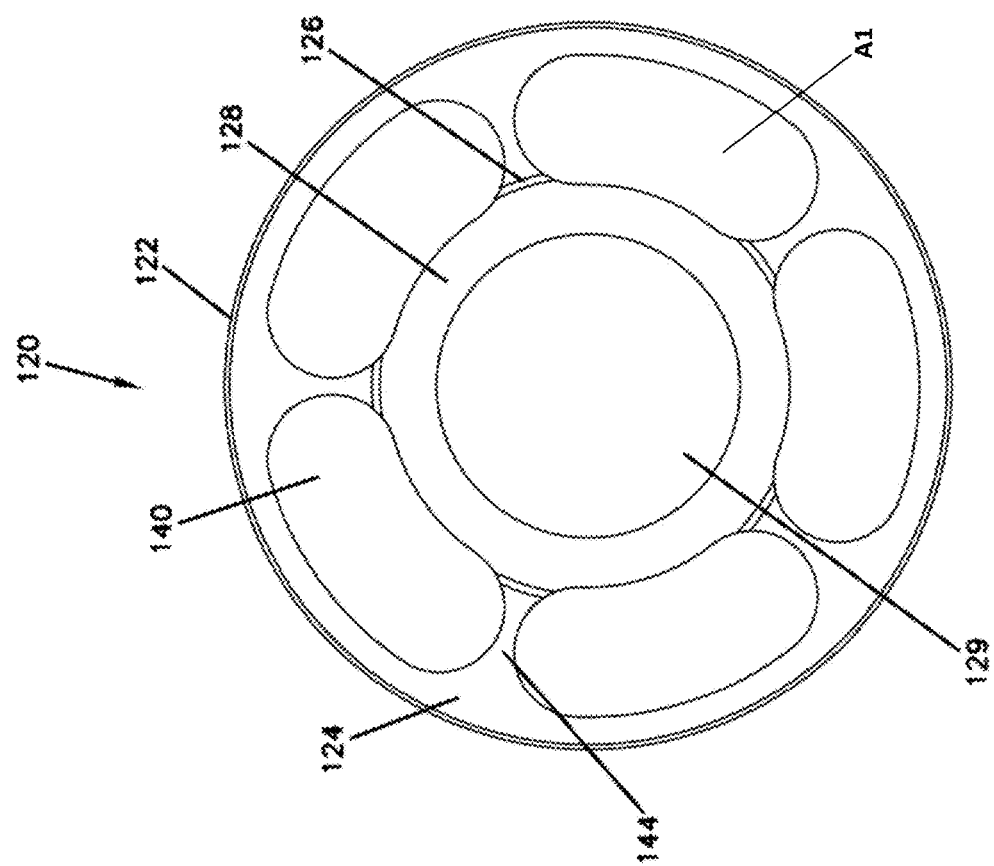
FIG. 4 is a top plan view of the valve shown in FIG. 3.
Figure 4A:
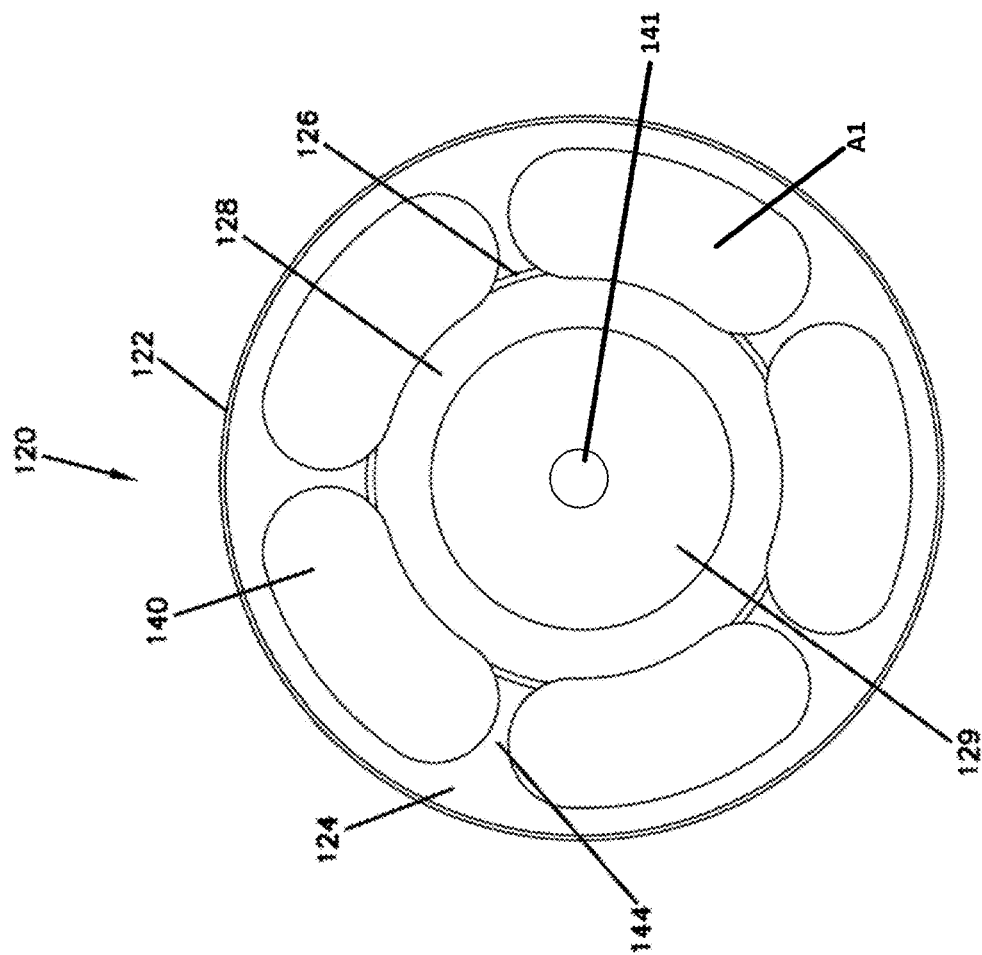
FIG. 4A is a top plan view of the valve shown in FIG. 3, with an additional aperture integrated through the center of the valve.
Figure 5:
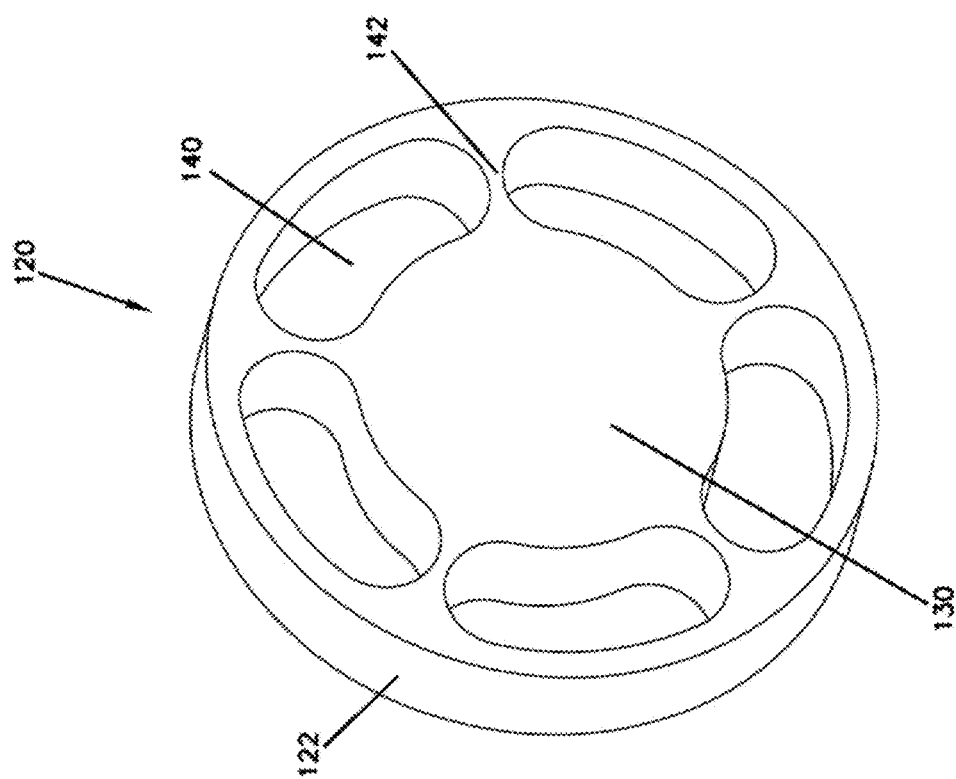
FIG. 5 is a bottom perspective view of the valve shown in FIG. 3.
Figure 6:
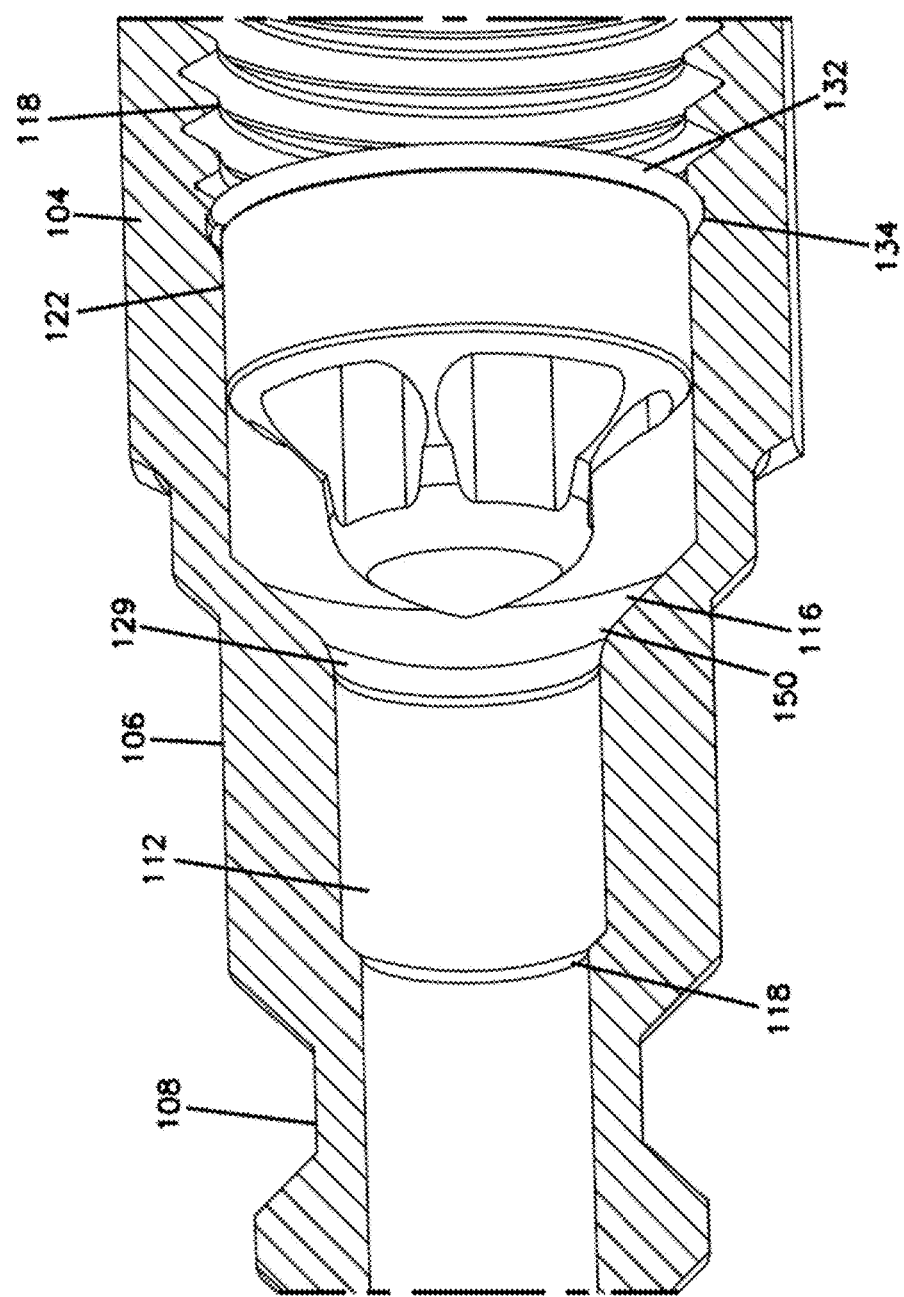
FIG. 6 is an enlarged fragmentary perspective section view of the coupler shown in FIG. 1.
Figure 12:
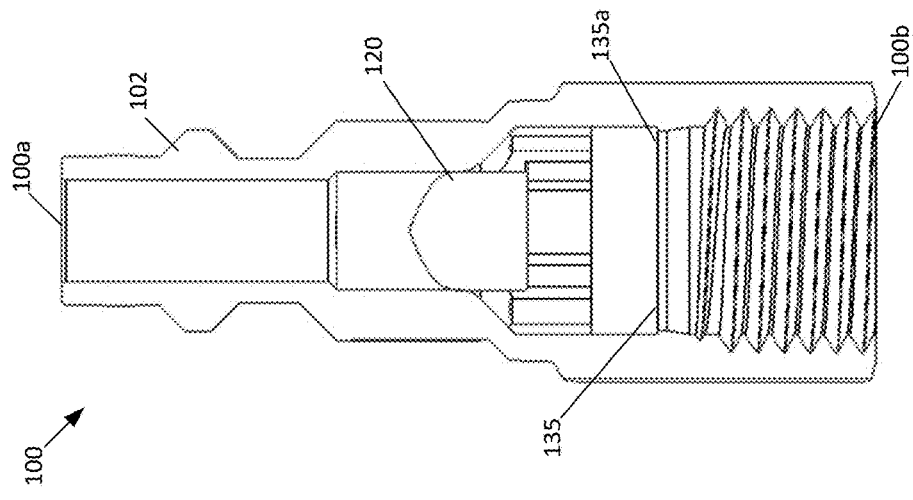
FIG. 12 is a cross-sectional view of the coupler shown in FIG. 10, with the valve shown in the open or first position.
Figure 13:
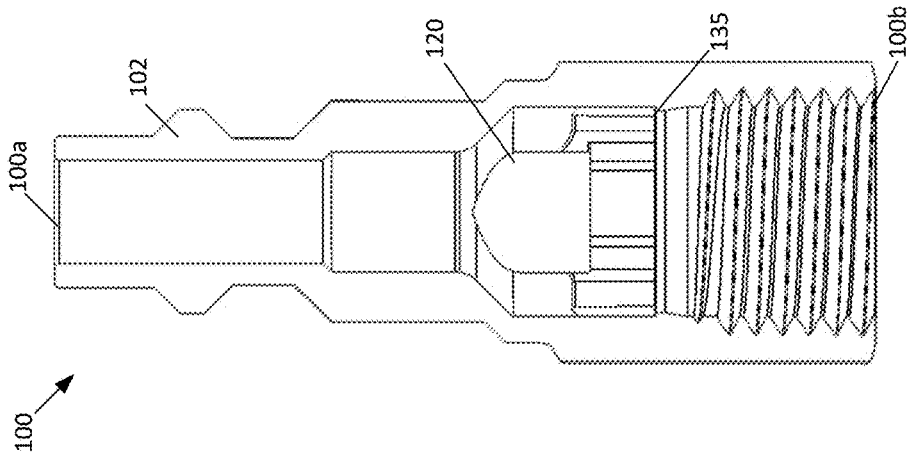
FIG. 13 is a cross-sectional view of the coupler shown in FIG. 10, with the valve shown in the closed or second position.
Figure 14:
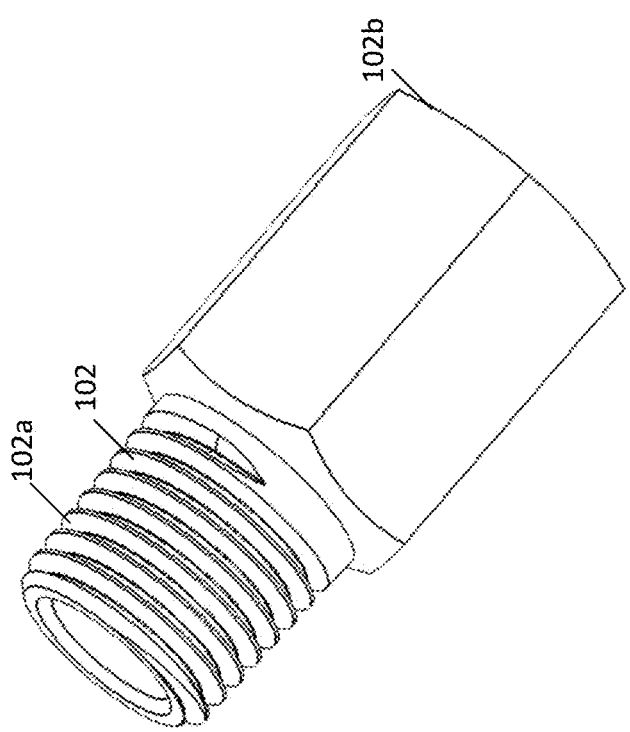
FIG. 14 is a perspective view of a third example of a coupler in accordance with concepts presented in the disclosure.
Figure 15:
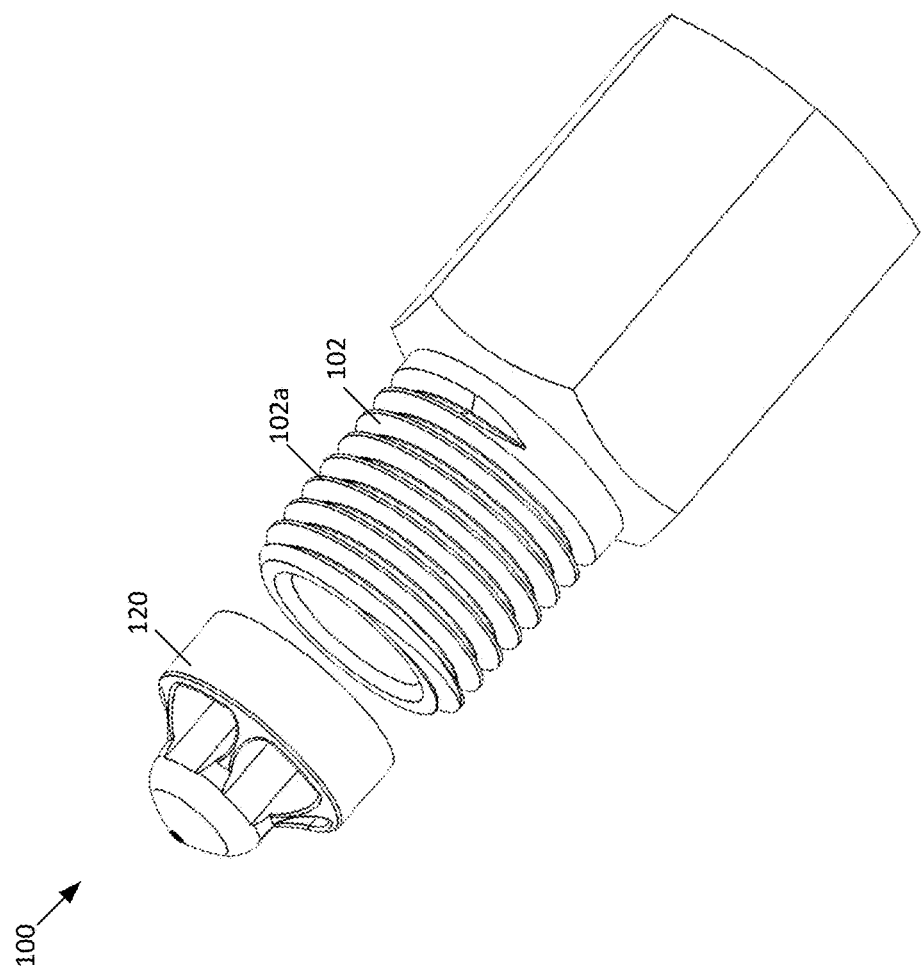
FIG. 15 is a perspective exploded view of the coupler shown in FIG. 14.
Figure 16:
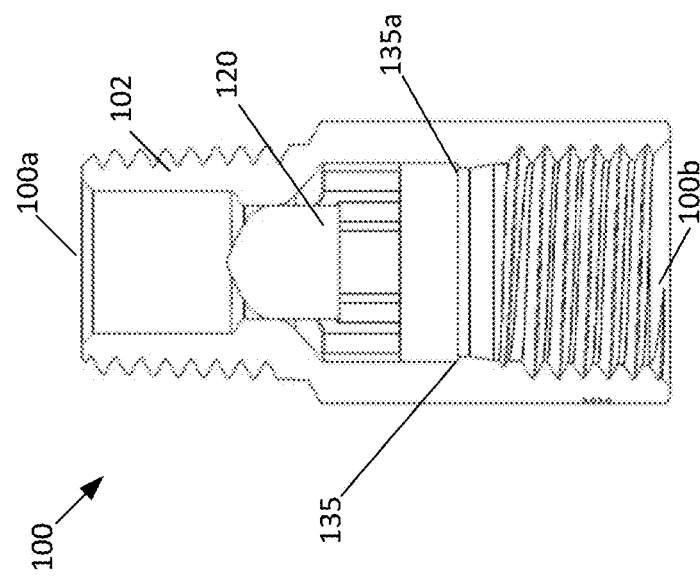
FIG. 16 is a cross-sectional view of the coupler shown in FIG. 14, with the valve shown in the open or first position.
Figure 17:
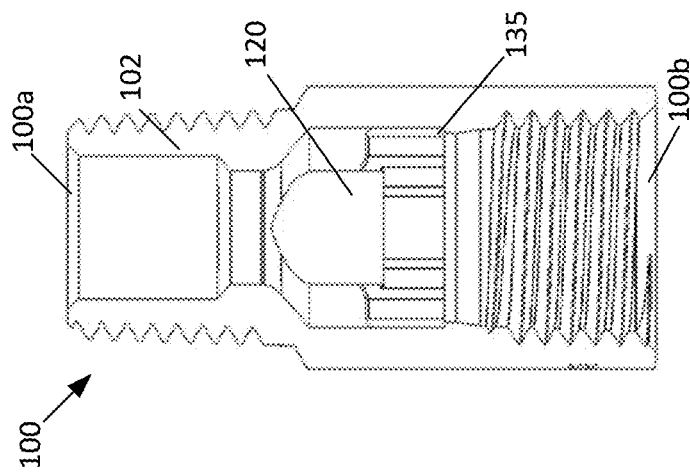
FIG. 17 is a cross-sectional view of the coupler shown in FIG. 14, with the valve shown in the closed or second position.
Figure 18:
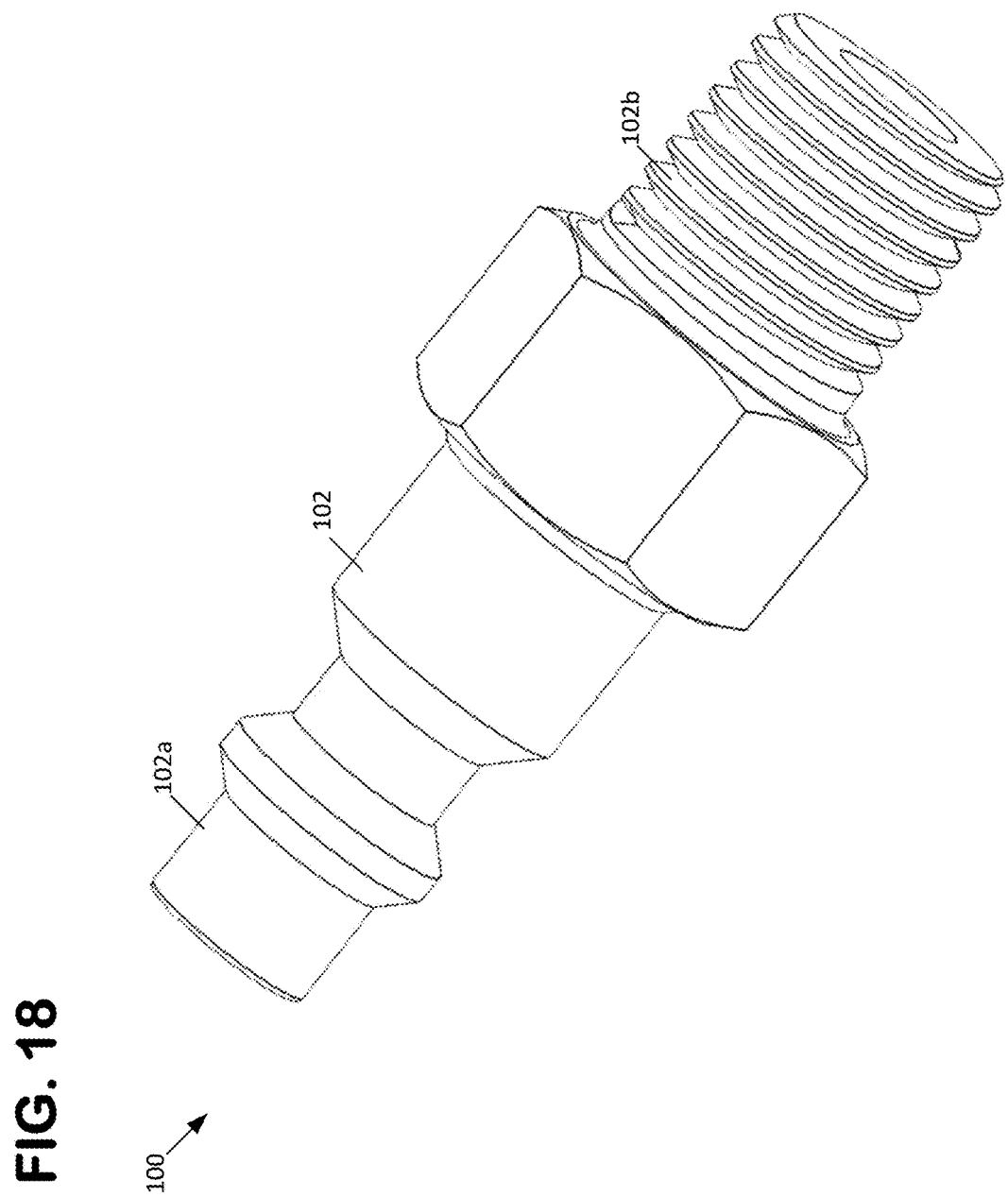
FIG. 18 is a perspective view of a fourth example of a coupler in accordance with concepts presented in the disclosure.
Figure 19:
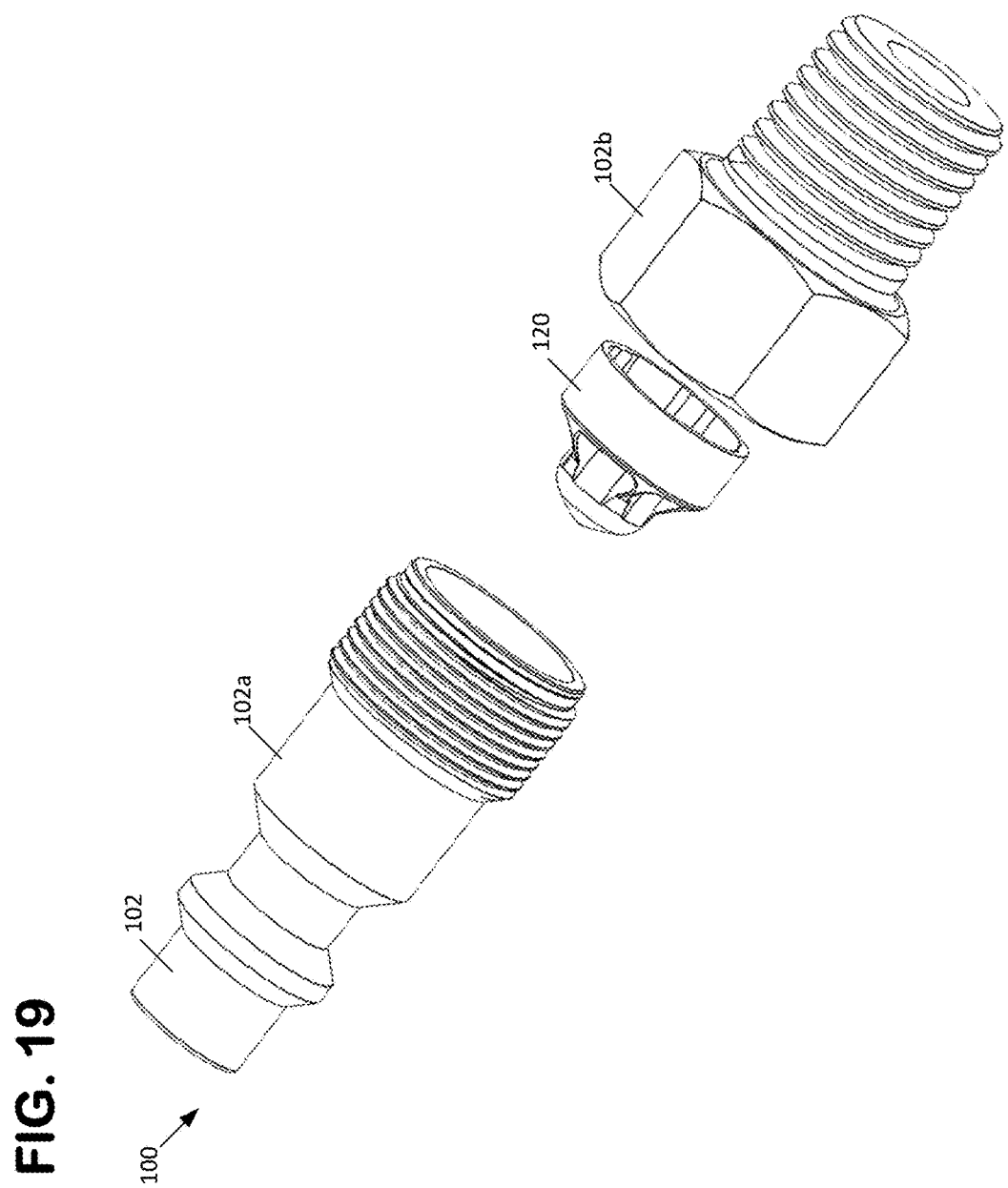
FIG. 19 is a perspective exploded view of the coupler shown in FIG. 18.
Figure 20:
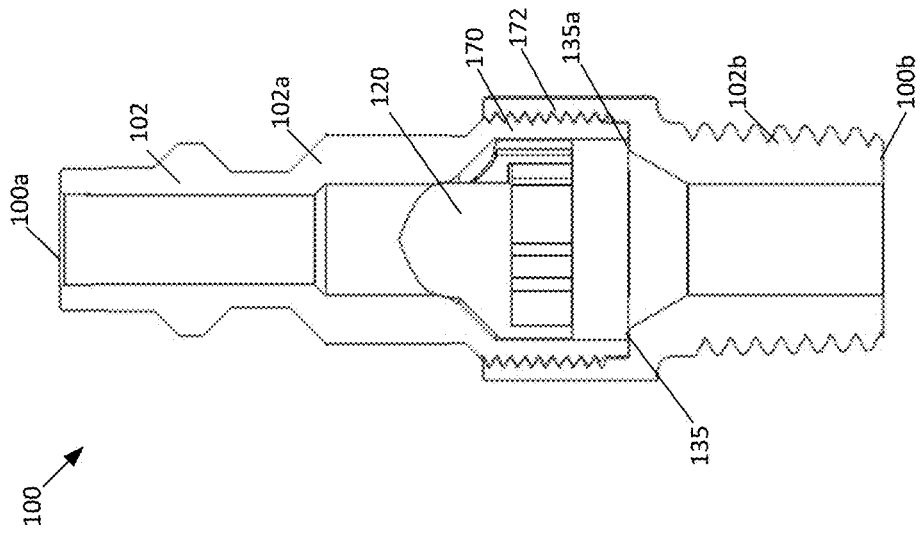
FIG. 20 is a cross-sectional view of the coupler shown in FIG. 18, with the valve shown in the open or first position.
Figure 21:
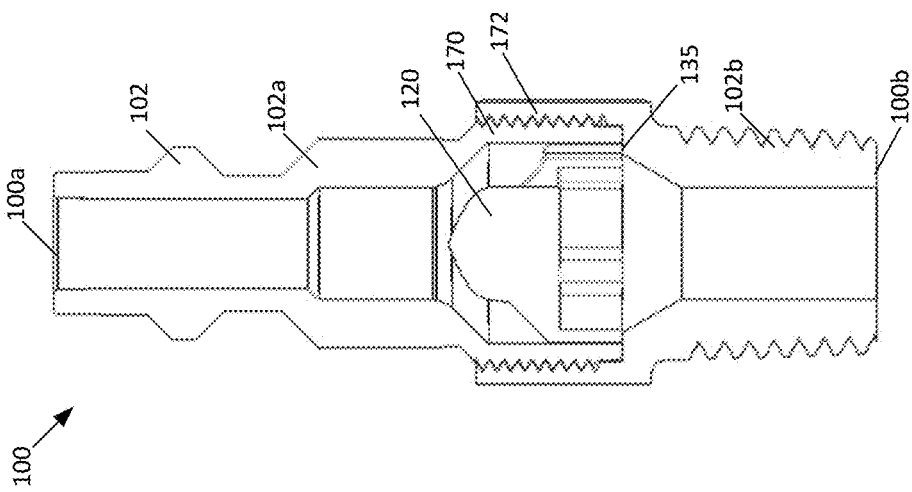
FIG. 21 is a cross-sectional view of the coupler shown in FIG. 18, with the valve shown in the closed or second position.
Figure 22:
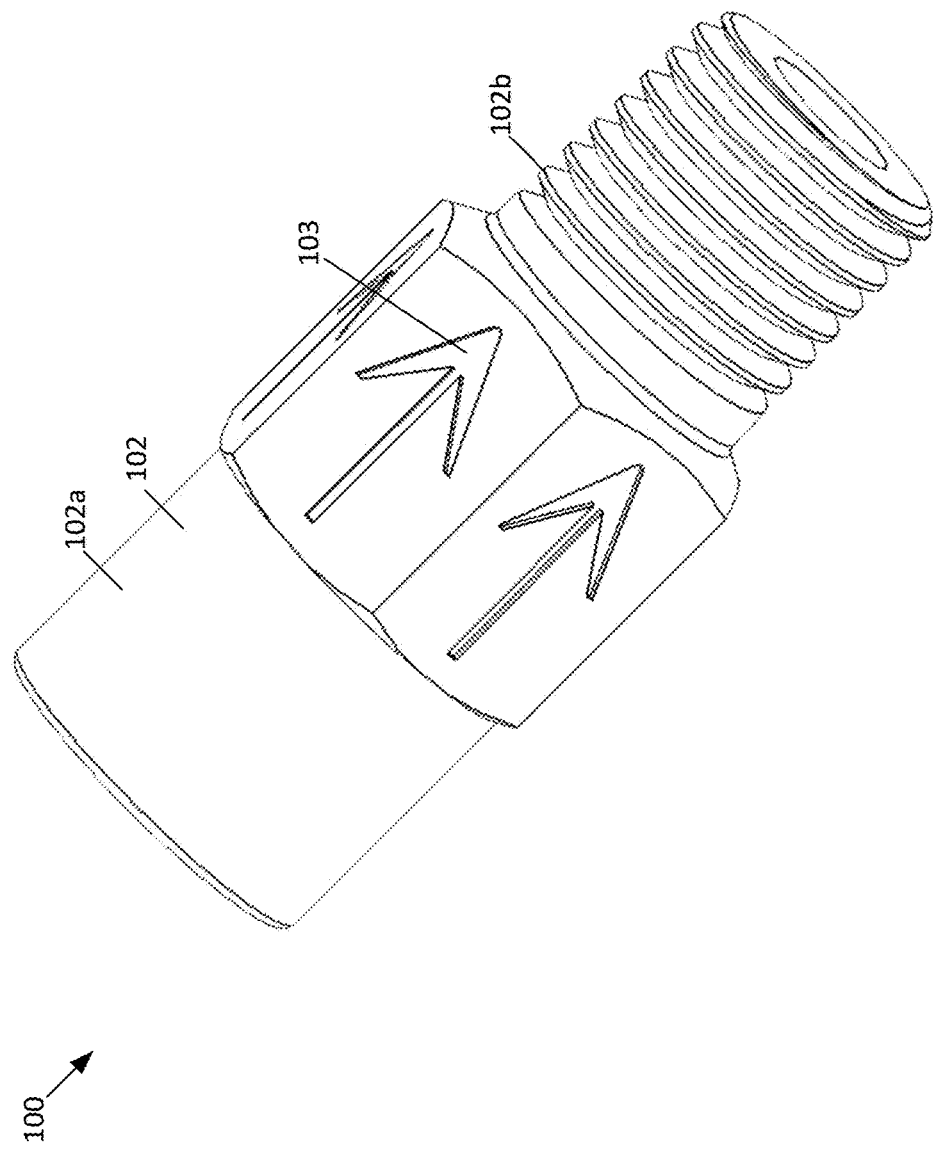
FIG. 22 is a perspective view of a fifth example of a coupler in accordance with concepts presented in the disclosure.
Figure 23:
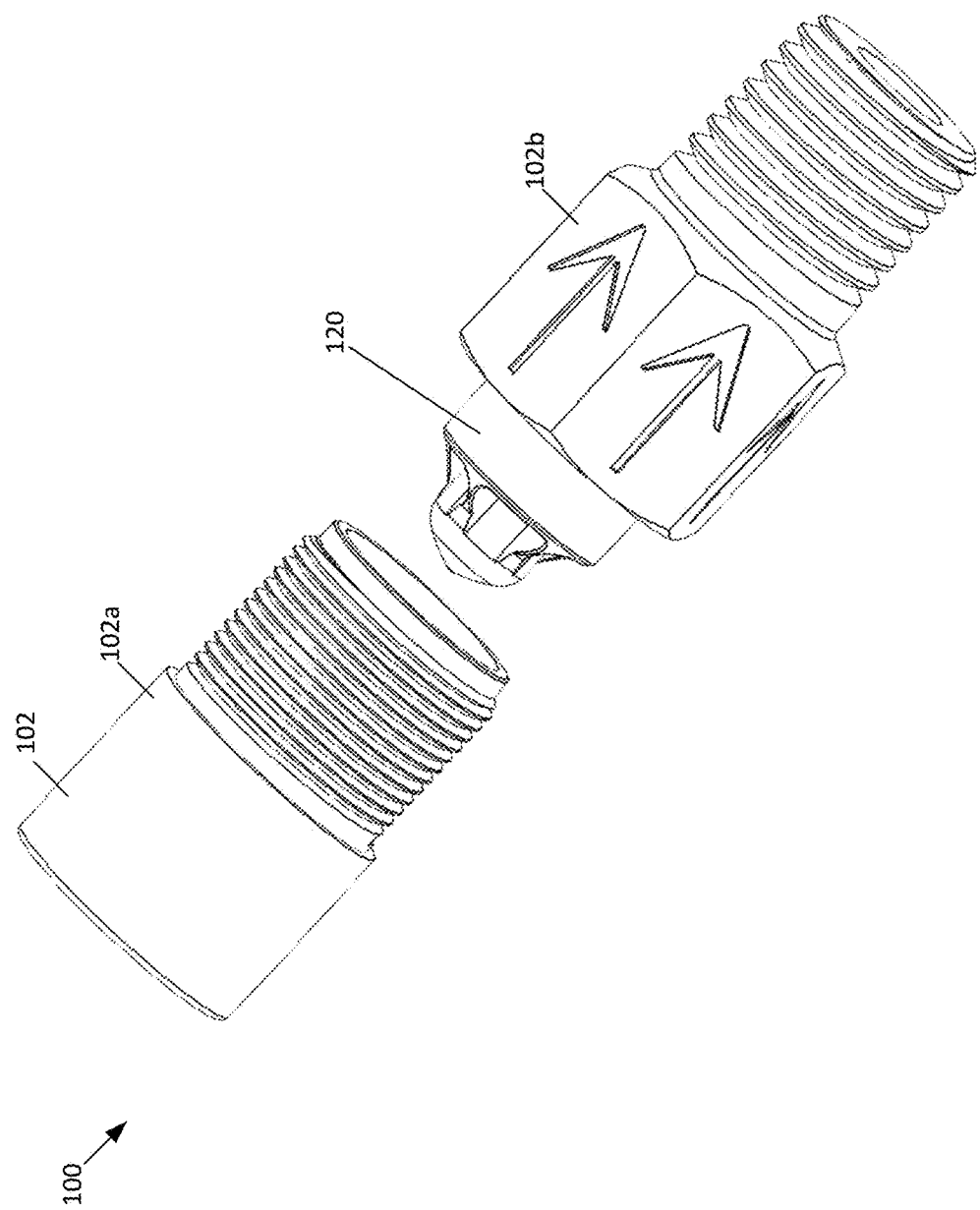
FIG. 23 is a perspective exploded view of the coupler shown in FIG. 22.
Figure 24:
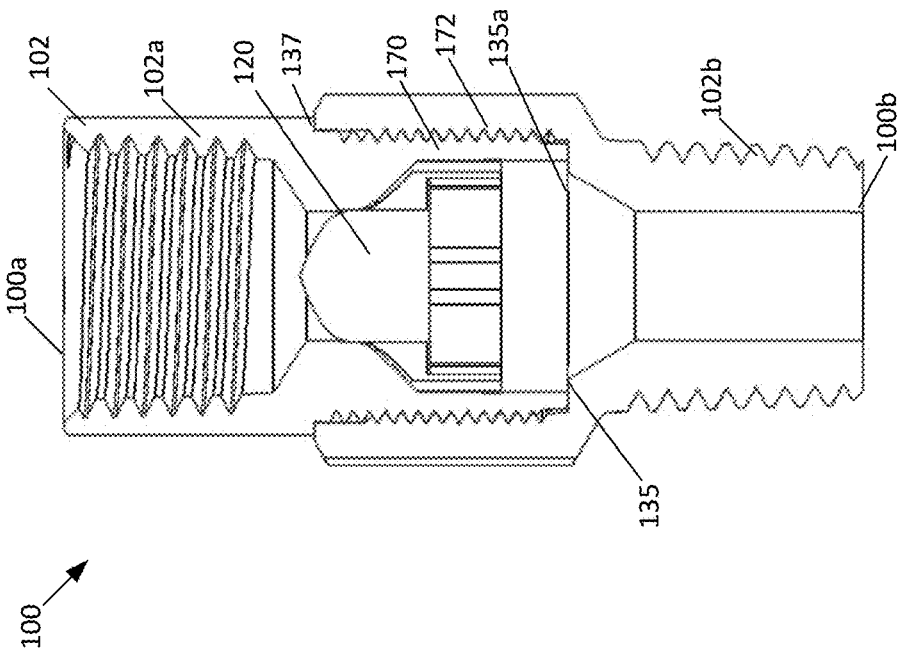
FIG. 24 is a cross-sectional view of the coupler shown in FIG. 22, with the valve shown in the open or first position.
Figure 25:
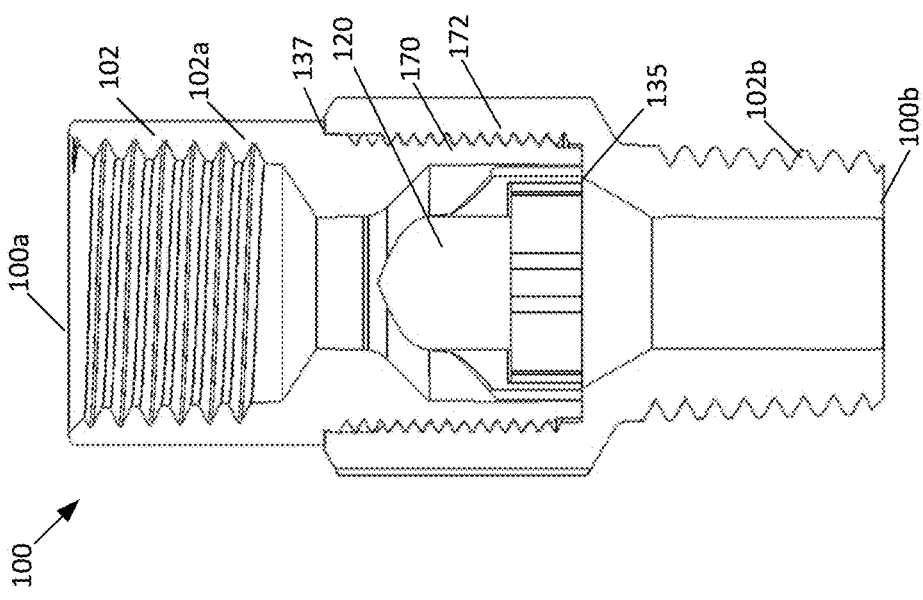
FIG. 25 is a cross-sectional view of the coupler shown in FIG. 22, with the valve shown in the closed or second position.
Figure 26:
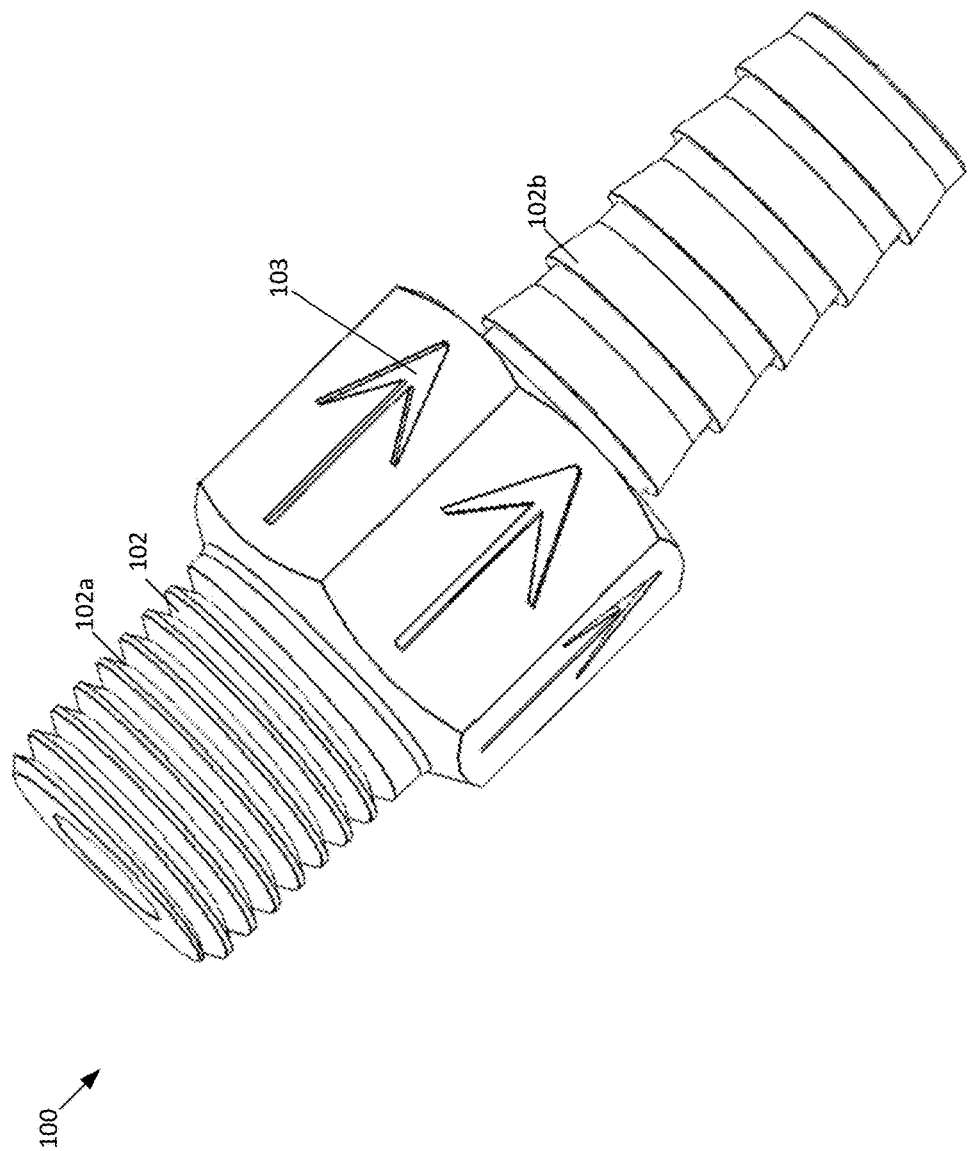
FIG. 26 is a perspective view of a sixth example of a coupler in accordance with concepts presented in the disclosure.
Figure 27:
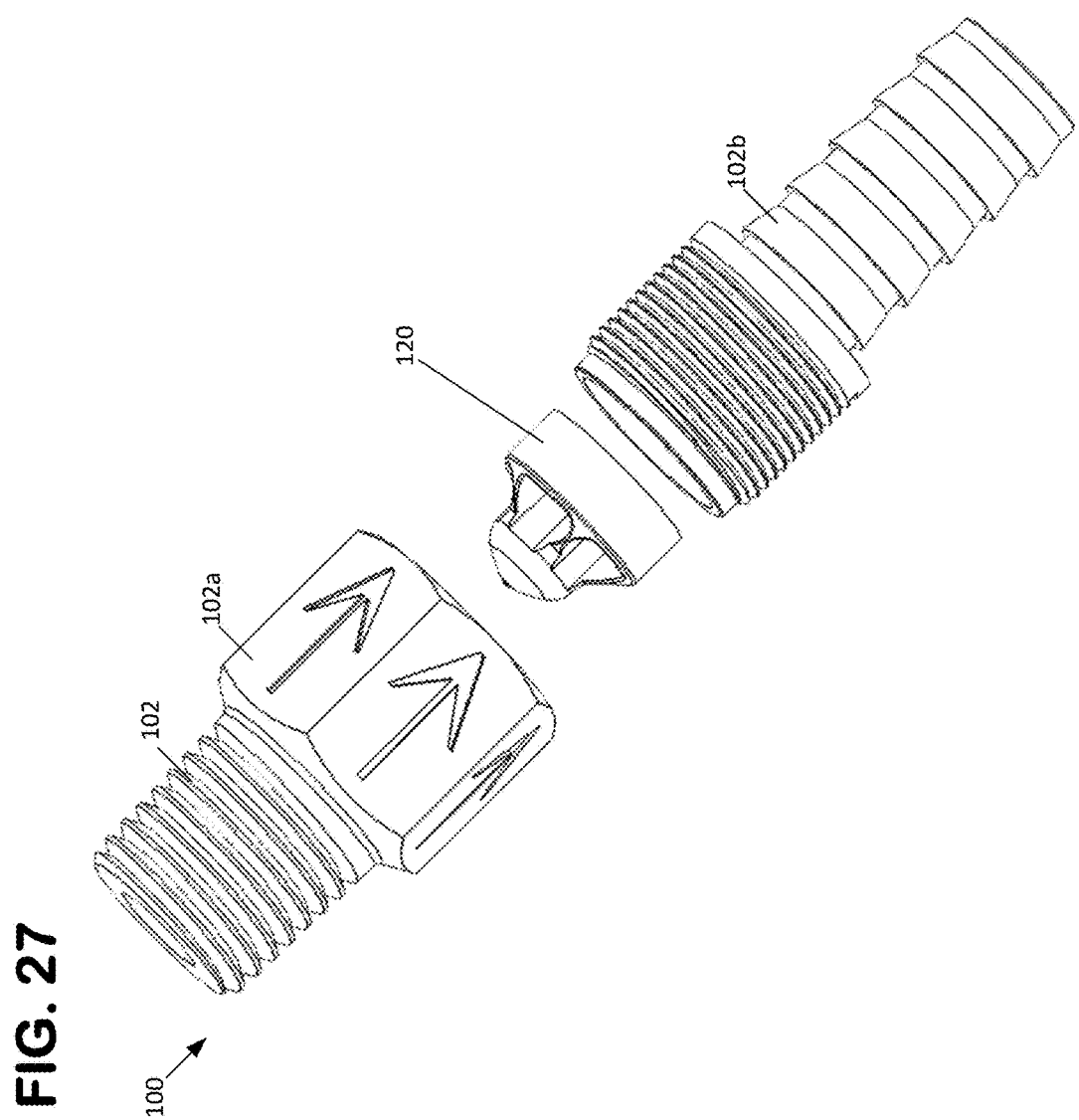
FIG. 27 is a perspective exploded view of the coupler shown in FIG. 26.
Figure 28:
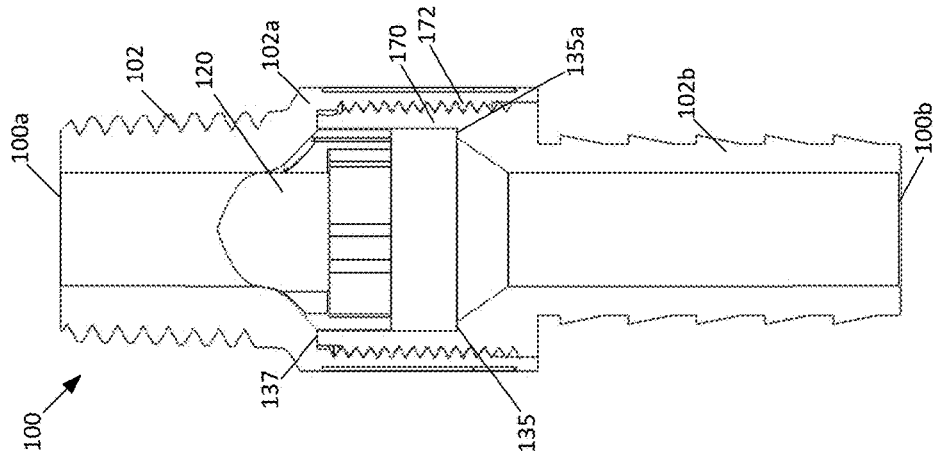
FIG. 28 is a cross-sectional view of the coupler shown in FIG. 26, with the valve shown in the open or first position.
Figure 29:
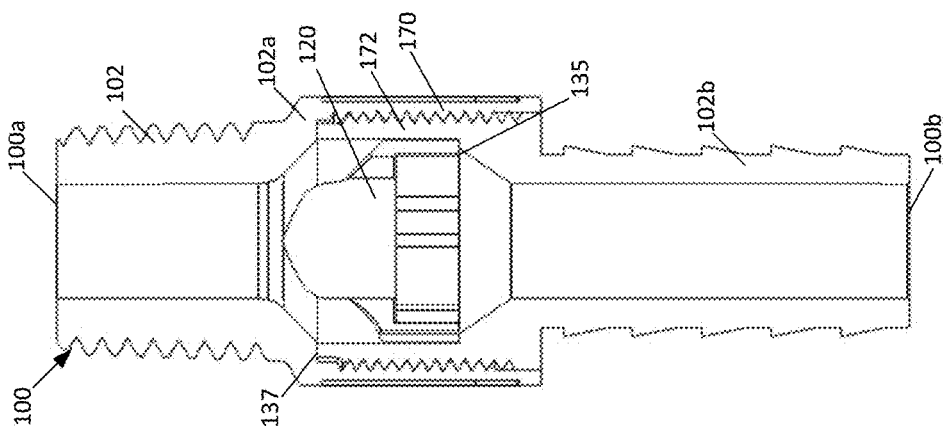
FIG. 29 is a cross-sectional view of the coupler shown in FIG. 26, with the valve shown in the closed or second position.

Referring to FIGS. 30 to 35, it can be seen that the valve 120 is generally the same as the valve 120 shown at FIGS. 3-5, but is modified such that the base portion 146 is recessed within the cylindrical body portion 122 so that the base portion 146 is more proximate the tip portion 129. This modification results in the cylindrical body portion 122 having a sidewall 122a and in a valve with a lower mass. To install the valve 120 within the coupler body 102, the valve 120 is inserted through the second end 100a of the coupler 100. To move the valve 120 past the shoulder 135, the valve 120 must compress or otherwise deflect around the shoulder 135. In one example, the valve 120 is formed from a polymeric material which enables the sidewall 122a to be more readily deflectable. Once the valve 120 is fully inserted such that the cylindrical outer body 122 passes the shoulder support surface 135a, the valve can expand back to its normal shape and the end of the sidewall 122a can be supported by the support surface 135a of the shoulder when the valve 120 is in the first position, as shown at FIG. 12. The valve is shown in the second position at FIG. 13.

FIGS. 14 to 17 show a third example of a coupler 100 that is generally similar to that presented at FIGS. 10 to 13, but wherein the connection arrangements at each end are differently configured. As such, the above provided description for the coupler 100 shown at FIGS. 10 to 13 is fully applicable to the coupler 100 shown at FIGS. 14 to 17. In the example shown at FIGS. 14 to 17, the first coupling arrangement provided proximate the first end 100a of the coupler is configured with male or external threads while the second coupling arrangement provided proximate the second end 100a is configured with female or internal threads. As is discussed elsewhere, other connection types for the first and second connection arrangements are possible.

Referring to FIGS. 18 to 21, a fourth example of a coupler 100 is presented. As many features of the couplers 100 shown in FIGS. 1 to 17 are similar to the coupler 100 shown at FIGS. 18 to 21, the above descriptions for the couplers 100 of FIGS. 1 to 21 are largely applicable for this example. The coupler 100 shown in FIGS. 18 to 21 is shown as including the valve 120 shown in FIGS. 30 to 35 with interacts with a shoulder 135 of the coupler body 102. The following description will be limited to differentiating features. In contrast to the examples shown at FIGS. 1 to 17, the coupler 100 shown at FIGS. 18 to 21 has a two-part coupler body 102 having a first part 102a and a second part 102b. As shown, the first part 102a is provided with male threads 170 that are received by female threads 172 provided on the second part 102b. In an alternative embodiment, the first part 102a can be provided with female threads and the second part 102b can be provided with male threads. In one aspect, the first part 102a is received into the second part 102b until the end of the first part 102a seats onto the shoulder 135 of the second part 102b. This configuration allows for the valve 120 to be inserted into the coupler body 102 without requiring the coupler body 102 to be pressed through the axial passageway 112 from the second end 100b of the coupler 100. Rather, the valve 120 can be simply installed into either of the first and second parts 102a, 102b before the first and second parts 102a, 102b are threaded together. This configuration also allows for the axial passageway 112 to be made narrower proximate the coupler second end 102b since the valve 120 does not need to be inserted therethrough. In the example shown, this configuration allows for male threads to be provided at the coupler second end 100b of a relatively smaller diameter, in comparison to a configuration where male threads provided on at the second end 100b of the coupler 100 shown at FIGS. 1 to 9 and 10-13.

FIGS. 22 to 25 show a fifth example of a coupler 100 that is generally similar to that presented at FIGS. 18 to 21, but wherein the connection arrangements at each end are differently configured. As such, the above provided description for the coupler 100 shown at FIGS. 18 to 21 is fully applicable to the coupler 100 shown at FIGS. 22 to 25. In the example shown at FIGS. 22 to 25, the first coupling arrangement provided proximate the first end 100a of the coupler is configured with female or internal threads while the second coupling arrangement provided proximate the second end 100a is configured as male or external threads. As is discussed elsewhere, other connection types for the first and second connection arrangements are possible. The coupler of FIGS. 22 to 25 is also shown as being provided with an additional shoulder 137 on the first coupler body part 102a against which an end of the second coupler body part 120b abuts when the first and second coupler body parts 102a, 102b are fully joined. The coupler 100 shown at FIGS. 22 to 25 is also provided with indicia 103, in the form of arrows, which indicate the direction of airflow during normal operation, such that it is clear to an installer or user as to which direction the coupler 100 should be installed.

FIGS. 26 to 29 show a sixth example of a coupler 100 that is generally similar to that presented at FIGS. 18 to 21, but wherein the connection arrangements at each end are differently configured. As such, the above provided description for the coupler 100 shown at FIGS. 18 to 21 is fully applicable to the coupler 100 shown at FIGS. 26 to 29. In the example shown at FIGS. 26 to 29, the first coupling arrangement provided proximate the first end 100a of the coupler is configured with male or external threads while the second coupling arrangement provided proximate the second end 100a is configured as a hose barb fitting. As is discussed elsewhere, other connection types for the first and second connection arrangements are possible. The coupler 100 shown at FIGS. 26 to 29 is also provided with indicia 103, in the form of arrows, which indicate the direction of airflow during normal operation, such that it is clear to an installer or user as to which direction the coupler 100 should be installed. The coupler shown in FIGS. 26 to 29 is also differently configured in that the first coupler part 102a is provided with female threads 172 and the second coupler part 102b is provided with male threads 170. The coupler of FIGS. 26 to 29 is also shown as being provided with an additional shoulder 137 on the first coupler body part 102a against which an end of the second coupler body part 120b abuts when the first and second coupler body parts 102a, 102b are fully joined.

Although the above described coupler 100 examples are shown as having a particular coupling arrangement at each end, the disclosure is not limited to such combinations of coupling arrangements for each example shown. As such, any of the disclosed couplers 100 can have a first coupling arrangement at the first end 100a that is any one of a male quick-disconnect coupler, a female quick-disconnect coupler, a male or external threaded connection, a female or internal threaded connection, a barbed fitting connection, or any other suitable connection type. Likewise, any of the disclosed couplers 100 can have a second coupling arrangement at the second end 100b that is any one of a male quick-disconnect coupler, a female quick-disconnect coupler, a male or external threaded connection, a female or internal threaded connection, a barbed fitting connection, or any other suitable connection type. The first and second coupling arrangements can be different from each other and provided in any combination or can be similar to each other.

Testing Results

Figure 36:
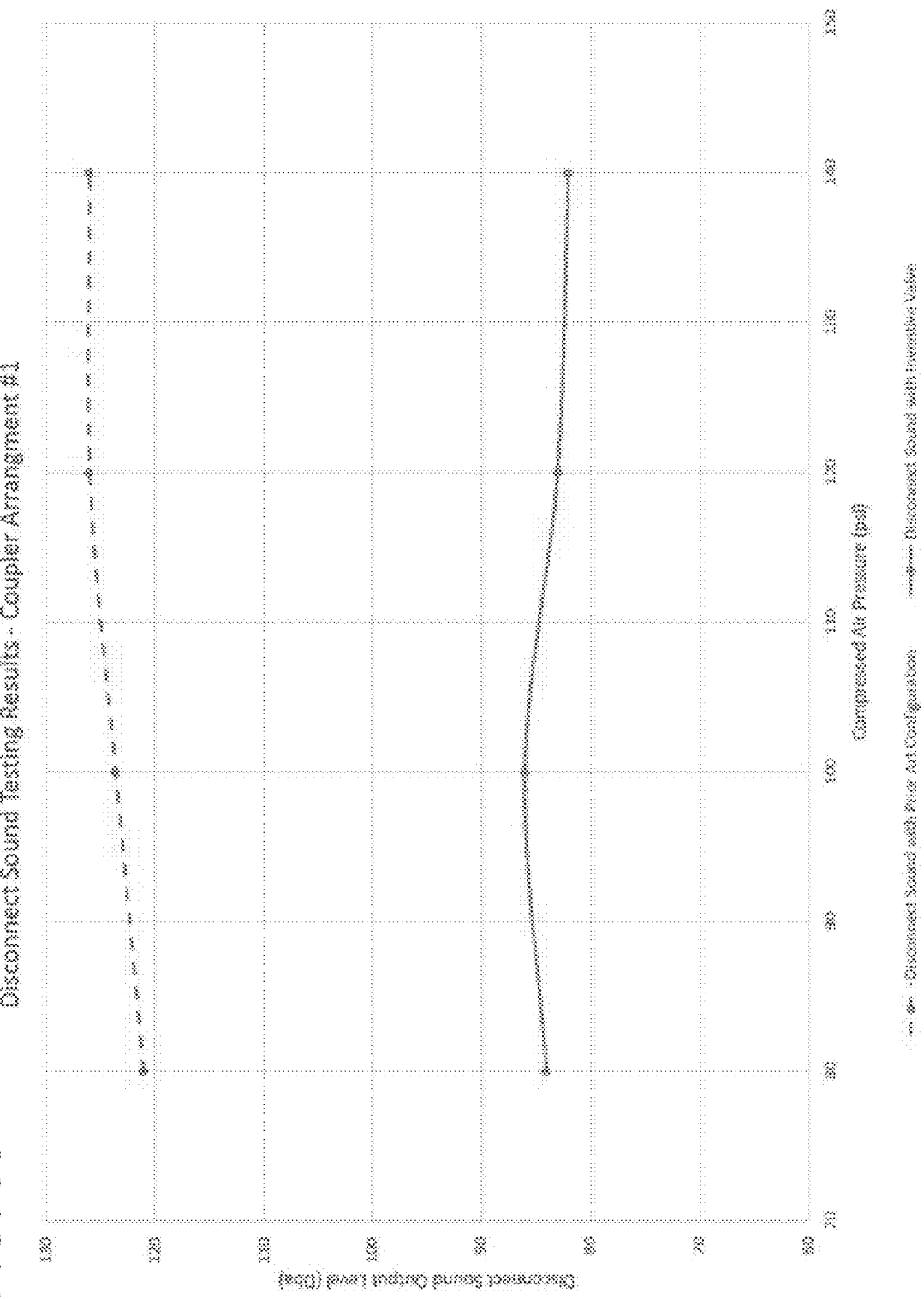
FIG. 36 is a graphical representation of sound testing results associated with the valve of the type shown in FIG. 3 with a first coupler arrangement.

Referring to FIGS. 36 to 39, testing results utilizing the valve 120 in a coupling arrangement are presented. For testing purposes, a coupler 100 and valve 120 of the type shown at FIGS. 14 to 17 was joined with a standard coupler to form a coupling arrangement. FIG. 36 shows sound testing results over a range of pressures between 80 and 140 psi for a first coupler arrangement with and without the valve 120. The first coupler arrangement included the use of a standard male coupler, Milton brand V (part #764), threaded onto the inventive coupler 100, a Milton brand V female coupler (part #761-1) removably connected to the standard Milton male coupler, and a 25 foot long ⅜ inch Flexilla brand air hose. A Galaxy CM-130 SPL meter was used to measure the sound levels produced when decoupling the female coupler part from the standard coupler under various pressures. To ensure reliability of the date, the standard Milton male and female couplers were connected and disconnected from each other ten times at each pressure and with peak sound level being measured upon disconnection. As can be seen at FIG. 36, a significant sound level reduction occurs with the use of the valve 120. The measured sound level reduction ranged from 37 to 44 dBA (A-weighted decibels) with an average sound reduction across all pressures of about 40 dBA. Accordingly, a disconnection procedure that would normally result in over 120 dBA in sound production is reduced to under 90 dBA through use of the disclosed valve 120.

Figure 37:
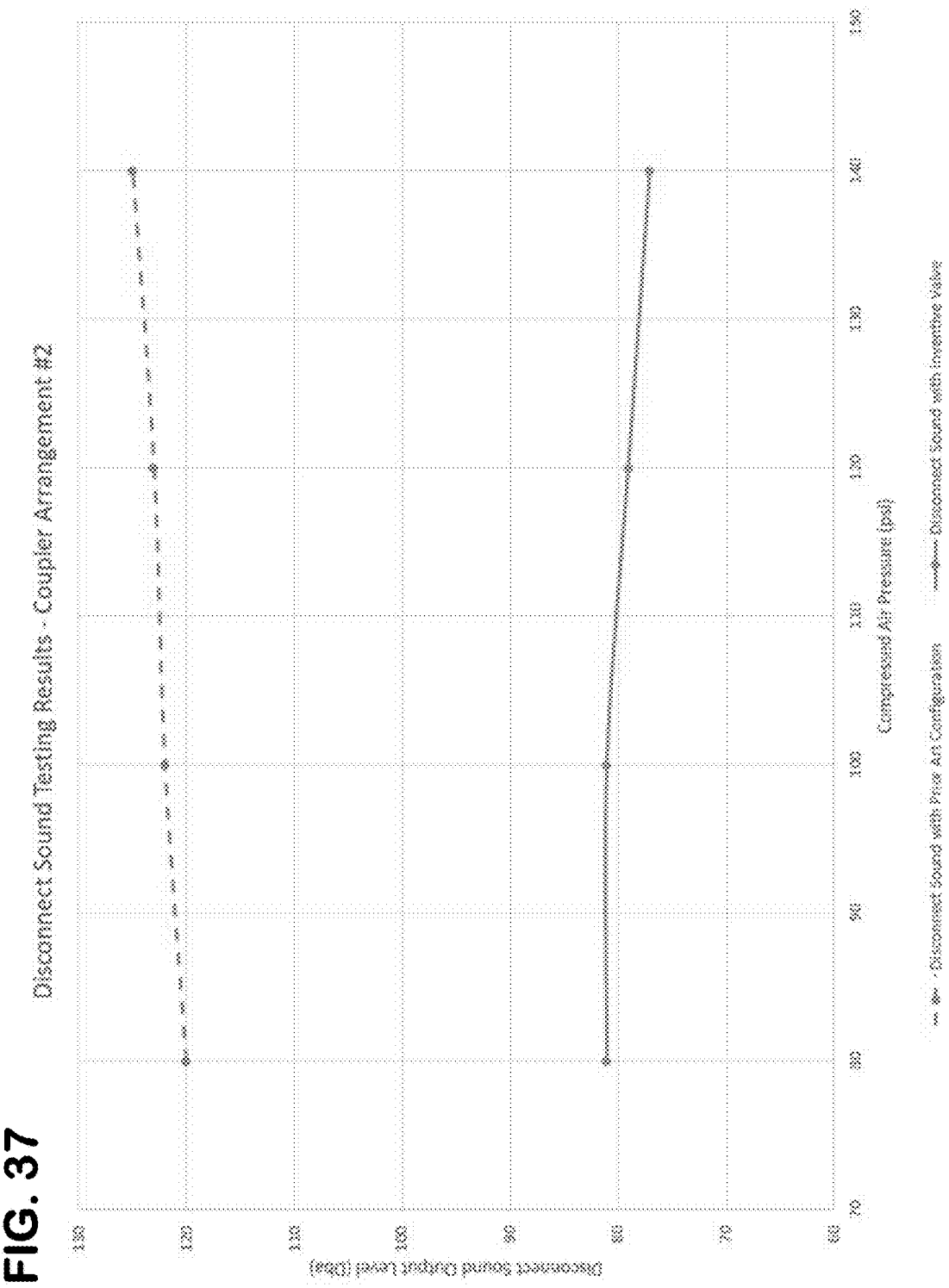
FIG. 37 is a graphical representation of sound testing results associated with the valve of the type shown in FIG. 3 with a second coupler arrangement.

Referring to FIG. 37, the same test procedure was conducted, but instead using a Master Force (Menards brand) ¼" high flow standard coupler threaded onto the coupler 100 shown at FIGS. 14 to 17 and Milton brand V female coupler removably coupled to the Master Force coupler. In this test, the measured sound level reduction when disconnecting the standard coupler from the female coupler ranged from 39 to 48 dBA (A-weighted decibels) with an average sound reduction across all pressures of about 43 dBA. Accordingly, a disconnection procedure that would normally result in over 120 dBA in sound production is reduced to under 90 dBA through use of the disclosed valve 120 is reaffirmed with this second test.

Figure 38:
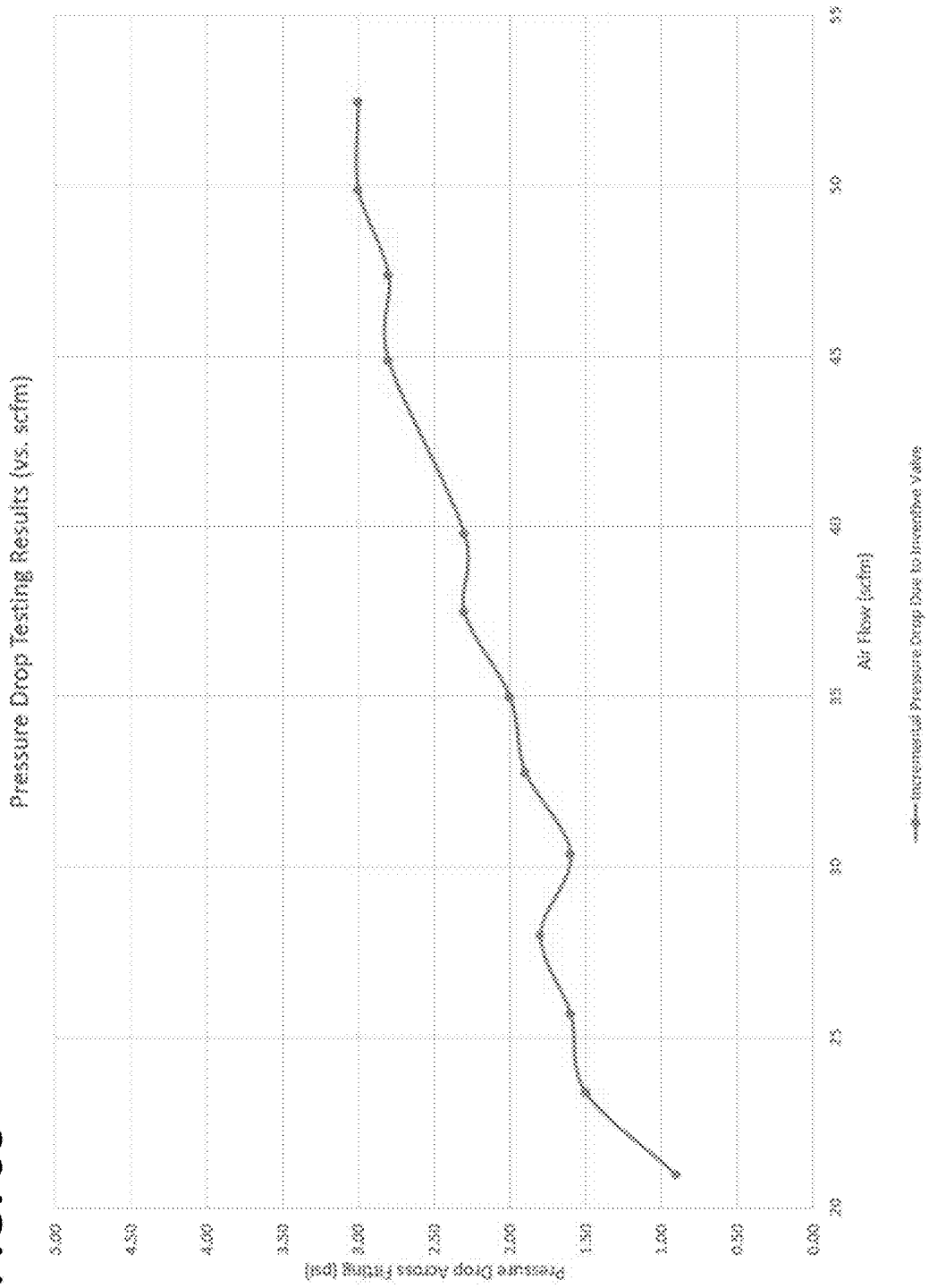
FIG. 38 is a graphical representation of pressure drop (versus a volumetric airflow rate) testing results associated with the valve of the type shown in FIG. 3.
Figure 39:
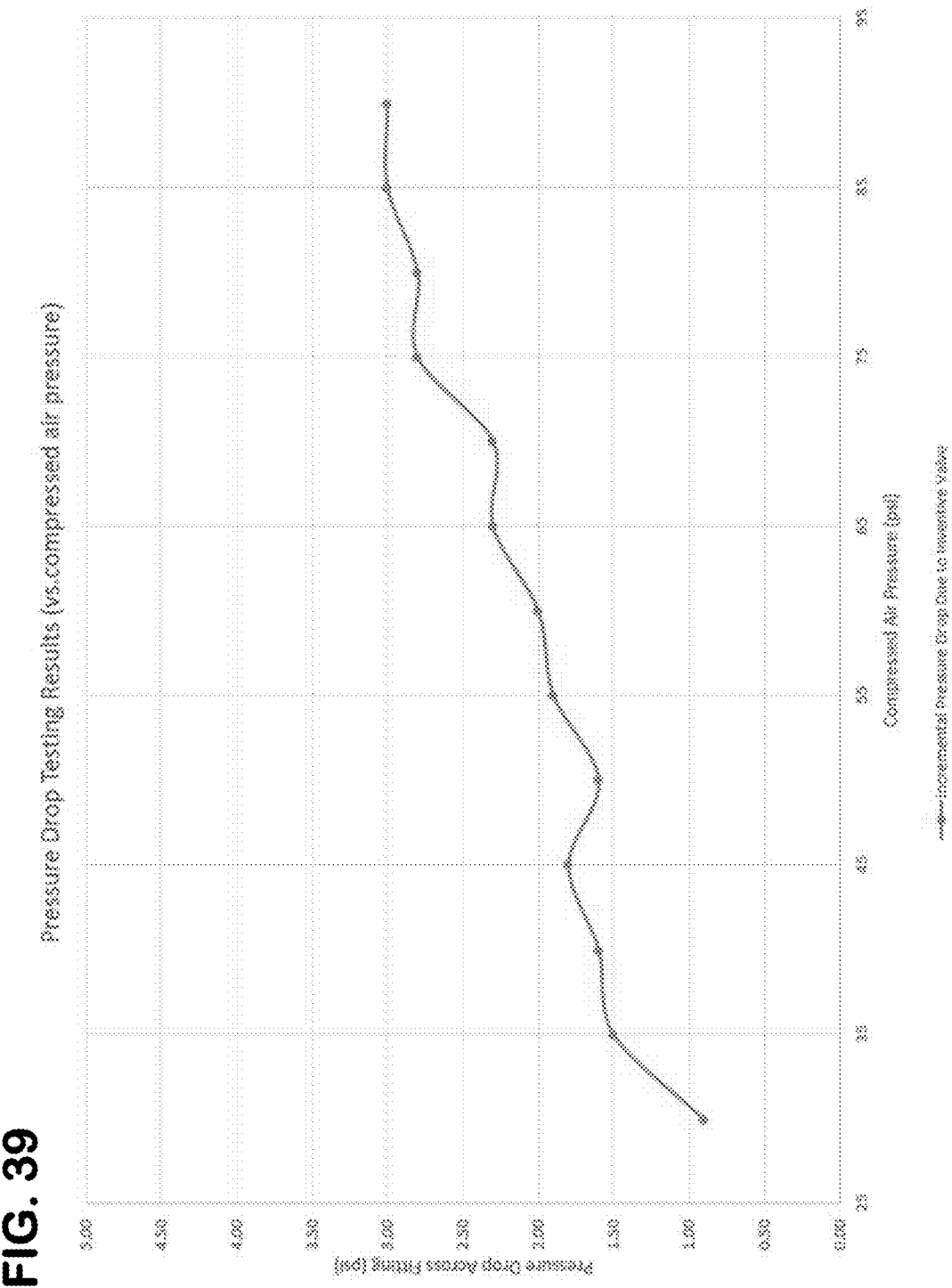
FIG. 39 is a graphical representation of pressure drop (versus a compressed air pressure) testing results associated with the valve of the type shown in FIG. 3.

Referring to FIGS. 38 and 39, it can be seen that the pressure drop associated with incorporating the valve 120 into a coupler body is minimal in comparison to the sound reduction levels achieved. As is shown in each graph, the tested pressure drop of the valve 120 ranges between 0.9 psi (pounds per square inch) at 30 psi of line pressure at a flow rate of 21 scfm (standard cubic feet per minute) to 3.0 psi at 90 psi of line pressure at a flow rate of 52.5 scfm. As a result of the testing, it can be plainly seen that the installation the valve 120 will result in only a minimum pressure drop of about 1 to 3 psi while reducing disconnect sound levels by 40 to 43 dBA on average. Advantageously, the incorporation of the valve 120 does not necessitate an increase in the form factor of the coupler thereby enabling the continued use of couplers that have standard dimensions. The demonstrated advantages of the tested configurations are not limited to only the tested configurations and are instead generally applicable to all of the designs disclosed in this application, particularly where the same valve 120 shown at FIGS. 30-35 is utilized.

While a preferred embodiment of the invention has been shown and described, other and further embodiments of the invention may be devised without departing from the basic scope thereof, and the scope thereof is determined by the claims which follow.

The invention claimed is:

1. A safety coupler comprising:
   a. a connector body including a sidewall defining an interior passageway extending along a longitudinal axis between a first open end and a second open end; and
   b. a valve disposed within the connector body interior passageway, the valve defining one or more axial passageways extending in a direction generally parallel to the longitudinal axis, the valve being movable within the connector body between a normal air flow position and a sound reduction position;
   c. wherein in the normal airflow position, the valve has less than a 10 psi pressure drop at an airflow rate of 20 to 50 scfm through the interior passageway;
   d. wherein in the sound reduction position, the valve reduces a coupler disconnect sound level by at least 20 dBA in comparison to a disconnect sound level when the connector body is used without the valve installed within the interior passageway.

2. The safety coupler of claim 1, wherein the valve has less than a 5 psi pressure drop when in the normal airflow position.

3. The safety coupler of claim 1, wherein the valve reduces the coupler disconnect sound level by at least 30 dBA.

* * * * *